US008973074B2

(12) United States Patent  
Singh et al.

(10) Patent No.: US 8,973,074 B2  
(45) Date of Patent: Mar. 3, 2015

(54) METHOD AND SYSTEM FOR ISOCHRONOUS COMMUNICATION IN AUDIO/VIDEO NETWORKS

(75) Inventors: Harkirat Singh, Santa Clara, CA (US); Ilju Na, Suwon (KR); Jae Min Lee, Suwon (KR); Chiu Ngo, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 568 days.

(21) Appl. No.: 13/103,949

(22) Filed: May 9, 2011

(65) Prior Publication Data

US 2011/0265139 A1    Oct. 27, 2011

Related U.S. Application Data

(63) Continuation-in-part of application No. 13/091,019, filed on Apr. 20, 2011.

(60) Provisional application No. 61/333,197, filed on May 10, 2010, provisional application No. 61/326,961, filed on Apr. 22, 2010.

(51) Int. Cl.
*H04N 7/173*  (2011.01)
*H04N 21/643* (2011.01)
(Continued)

(52) U.S. Cl.
CPC ..... *H04N 21/64322* (2013.01); *H04N 21/6437* (2013.01); *H04N 21/64723* (2013.01)
USPC .......................................................... 725/116

(58) Field of Classification Search
CPC ........................ H04N 21/235; H04N 7/17318
USPC ........................................................ 725/116
See application file for complete search history.

(56) References Cited

U.S. PATENT DOCUMENTS 6,925,518 B2    8/2005  Rudland et al.
7,010,607 B1 *  3/2006  Bunton ........................ 709/228
(Continued)

FOREIGN PATENT DOCUMENTS

KR    1019980070589 A    10/1998
KR    1020000049091 A     7/2000
(Continued)

OTHER PUBLICATIONS

International Search Report and Written Opinion dated Dec. 27, 2011 for International Application No. PCT/KR2011/003469 from Korean Intellectual Property Office, pp. 1-10, Seo-gu, Daejeon, Republic of Korea.

(Continued)

*Primary Examiner* — Nathan Flynn
*Assistant Examiner* — Alfonso Castro
(74) *Attorney, Agent, or Firm* — Sherman IP LLP; Kenneth L. Sherman; Steven Laut

(57) ABSTRACT

Method and system for isochronous communication between audio/video (AV) devices. One implementation comprises establishing isochronous connection between a source AV device and a destination AV device. Each AV device includes multiple I/O ports for connecting the AV device to another AV device via a communication link comprising multiple communication lanes. The isochronous connection is established by determining end-to-end temporal and spatial lane availability between the source AV device and the destination AV device to support a target date rate. Communication resources are allocated on the available lanes based on the target date rate for isochronous communication between the source AV device and the destination AV device.

49 Claims, 19 Drawing Sheets

(51) Int. Cl.
*H04N 21/6437* (2011.01)
*H04N 21/647* (2011.01)

(56) References Cited

U.S. PATENT DOCUMENTS

| | | | |
|---|---|---|---|
| 7,277,402 B2 | 10/2007 | Legallais et al. | |
| 7,574,550 B2* | 8/2009 | Feng | 710/311 |
| 7,802,049 B2 | 9/2010 | Levy | |
| 7,835,374 B2 | 11/2010 | Diab et al. | |
| 7,839,860 B2 | 11/2010 | Kobayashi | |
| 8,259,761 B2* | 9/2012 | Diab et al. | 370/535 |
| 2008/0037589 A1 | 2/2008 | Kliger et al. | |
| 2008/0089321 A1* | 4/2008 | Arulappan et al. | 370/386 |
| 2008/0219176 A1* | 9/2008 | Yamada | 370/252 |
| 2009/0193164 A1* | 7/2009 | Ajanovic et al. | 710/107 |
| 2009/0207866 A1 | 8/2009 | Cholas et al. | |
| 2010/0214906 A9* | 8/2010 | Diab et al. | 370/201 |
| 2011/0261823 A1 | 10/2011 | Singh et al. | |
| 2011/0265137 A1 | 10/2011 | Singh et al. | |
| 2012/0151537 A1 | 6/2012 | Singh et al. | |

FOREIGN PATENT DOCUMENTS

| | | |
|---|---|---|
| KR | 1020000052547 A | 8/2000 |
| KR | 1020010080608 A | 8/2001 |
| KR | 1020020018970 A | 3/2002 |
| KR | 1020060033445 A | 4/2006 |
| KR | 1020070073556 A | 7/2007 |

OTHER PUBLICATIONS

International Search Report and Written Opinion dated Jan. 19, 2012 for International Application No. PCT/KR2011/003753 from Korean Intellectual Property Office, pp. 1-8, Seo-gu, Daejeon, Republic of Korea.

IEEE Computer Society, "IEEE Std 802.1D™—2004, IEEE Standard for Local and metropolitan area networks, Media Access Control (MAC) Bridges", IEEE, Jun. 9, 2004, pp. i-269, New York, United States.

IEEE Computer Society, "IEEE Std 802.15.3c™—2009, IEEE Standard for Information technology—Telecommunications and information exchange between systems—Local and metropolitan area networks—Specific requirements, Part 15.3: Wireless Medium Access Control (MAC) and Physical Layer (PHY) Specifications for High Rate Wireless Personal Area Networks (WPANs), Amendment 2: Millimeter-wave-based Alternative Physical Layer Extension", IEEE, Oct. 12, 2009, pp. i-187, New York, United States.

IEEE Computer Society, "IEEE Std 802.11n™—2009, IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 5: Enhancements for Higher Throughput", IEEE, Oct. 29, 2009, pp. i-502, New York, United States.

U.S. Non-Final Office Action for U.S. Appl. No. 13/112,973 mailed Nov. 20, 2013.

International Search Report and Written Opinion dated Jul. 31, 2012 for International Application No. PCT/KR2011/009618 from Korean Intellectual Property Office, pp. 1-8, Seo-gu, Daejeon, Republic of Korea.

U.S. Non-Final Office Action for U.S. Appl. No. 13/091,019 mailed Aug. 1, 2013.

U.S. Final Office Action for U.S. Appl. No. 13/112,973 mailed Jun. 4, 2014.

U.S. Final Office Action for U.S. Appl. No. 13/091,019 mailed Feb. 26, 2014.

U.S. Advisory Action for U.S. Appl. No. 13/091,019 mailed May 14, 2014.

U.S. Non-Final Office Action for U.S. Appl. No. 13/091,019 mailed Jun. 23, 2014.

U.S. Advisory Action for U.S. Appl. No. 13/112,973 mailed Aug. 27, 2014.

U.S. Notice of Allowance for U.S. Appl. No. 13/091,019 mailed Oct. 3, 2014.

* cited by examiner

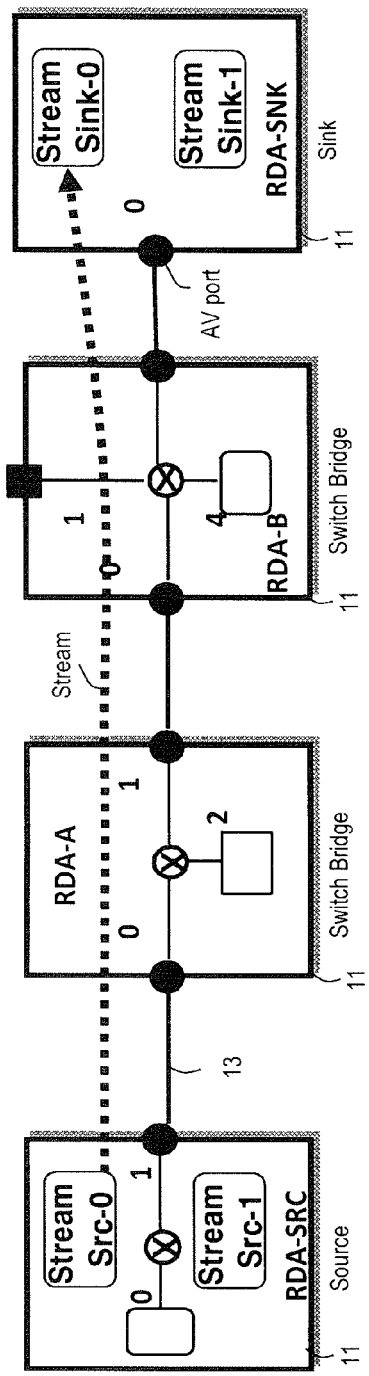
FIG. 9
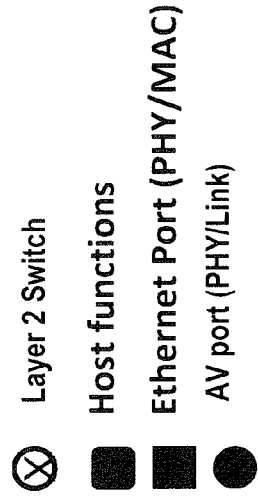
FIG. 10
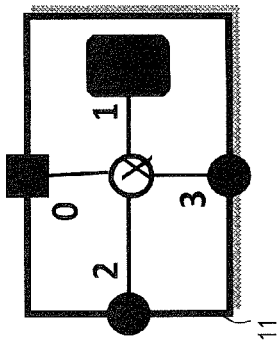

100

METHOD AND SYSTEM FOR ISOCHRONOUS COMMUNICATION IN AUDIO/VIDEO NETWORKS

RELATED APPLICATIONS

This application is a continuation-in-part of U.S. patent application Ser. No. 13/091,019, filed on Apr. 20, 2011, which claims priority from U.S. Provisional Patent Application Ser. No. 61/326,961, filed on Apr. 22, 2010, both incorporated herein by reference. This application further claims priority from U.S. Provisional Patent Application Ser. No. 61/333,197, filed on May 10, 2010, incorporated herein by reference.

FIELD OF THE INVENTION

The present invention relates in general to video transmission, and in particular, to isochronous stream management in a high speed video network.

BACKGROUND OF THE INVENTION

Increasing quantity of multimedia content, and specifically high quality multimedia content, presents a number of communication and processing challenges to designers and administrators of computing platforms and networks alike. Video Electronics Standards Association (VESA), Digital Interactive Interface for Video and Audio (DiiVA), and HDBaseT Alliance provide industry-wide interface standards directed to unidirectional transport of high quality multimedia data between two electronic devices.

BRIEF SUMMARY

A method and system for isochronous communication in audio/video (AV) networks is provided. One embodiment comprises establishing isochronous connection between a source AV device and a destination AV device. Each AV device includes multiple I/O ports for connecting the AV device to another AV device via a communication link comprising multiple communication lanes. The isochronous connection is established by determining end-to-end temporal and spatial lane availability between the source AV device and the destination AV device to support a target data rate. Communication resources are allocated on the available lanes based on the target data rate for isochronous communication between the source AV device and the destination AV device.

These and other features, aspects and advantages of the present invention will become understood with reference to the following description, appended claims and accompanying figures.

BRIEF DESCRIPTION OF THE DRAWINGS

FIG. 9 shows a block diagram of a network of AV devices including a source AV device and a destination AV device, implementing isochronous connection set-up for audio/video data communication, according to an embodiment of the invention.

FIG. 10 shows a more detailed block diagram of a switched AV bridge device in the AV network of FIG. 9, according to an embodiment of the invention.

DESCRIPTION OF THE INVENTION

Figure 1:
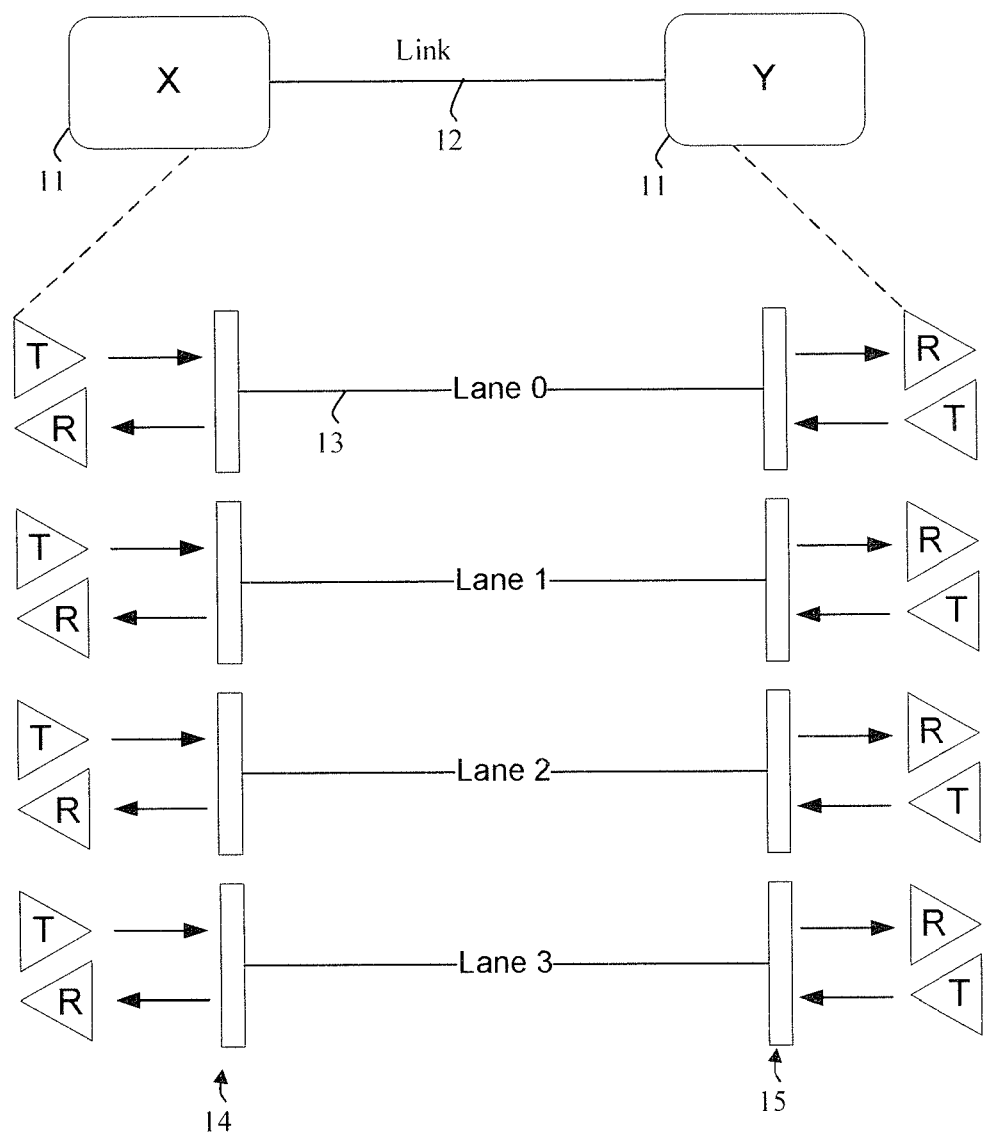
FIG. 1 shows a block diagram of a network of AV devices including a source audio/video (AV) device and a destination AV device, implementing isochronous data stream management for audio/video data communication, according to an embodiment of the invention.

Embodiments of the invention provide a method and system for isochronous data stream management in multimedia networks such as high speed video networks comprising multiple audio/video (AV) electronic devices.

In one embodiment the invention provides a method and system for isochronous connection set-up for streaming multimedia data including AV data in a high speed AV network comprising multiple AV devices. Streaming data includes bi-directional transport of multimedia data comprising multimedia data using an AV path setup scheme for isochronous data streaming between a multimedia source AV device and a multimedia sink AV device in an AV network.

In one embodiment, transport of multimedia data comprises using an AV path setup scheme from the source AV device to the sink AV device in a high speed AV network, to meet the increased communication demands. A connection is set-up between the source AV device and the sink AV device, wherein the connection set up process comprises a combination of modular processes that can be executed independently. In one embodiment the connection set up processes comprise: (1) reading the maximum available bandwidth on temporally and spatially free lanes in a communication link from the AV source device to the sink AV device, (2) determining the capability of a consuming device at the AV sink device (such as a video display at the AV sink device), (3) performing data link training (either progressive partial training or full training), and (4) allocating processing and communication resources on the trained lanes. In one implementation, progressive partial training comprises training sufficient number of spatial and temporal lanes on each communication link to meet a target data rate, and full mode training comprises training all available lanes.

Accordingly, embodiments of the invention allow an AV device which is capable of supporting high speed AV data, to perform end-to-end temporal and spatial lane availability checks to determine the maximum supported isochronous data rate end-to-end in a particular direction on communication links in the AV network. Link training comprises performing link training end-to-end, wherein partial progressive link training is on a per-hop basis on the minimum number of lanes that can support an estimated bandwidth request end-to-end. If an ensuing bandwidth request for video communication cannot be satisfied by using the minimum number of lanes, then more lanes are trained on a per link basis, not exceeding the maximum number of free lanes available. Full mode training comprises training on a per hop basis all lanes supported in a given direction.

In one embodiment, information such as the maximum end-to-end data rate or capability of a consuming device at the AV sink device (e.g., display capability of a display at the AV sink device), can be obtained from a controller device in the AV network when such a device is available in the network. In this case, it is assumed that the controller device maintains availability of temporal and spatial lanes and the corresponding data rate on each link in the network.

According to an embodiment of the invention, a forwarding table at each AV device is used to forward control messages including video path setup requests, and response messages, from the multimedia source AV device to the multimedia sink AV device. The video path setup requests are for allocation of isochronous communication resources such as lanes, their direction of data flow and symbols (or allocated channel time duration) on the selected lanes. Said isochronous resources are tracked in the forwarding table.

According to an embodiment of the invention, the port and lane for forwarding of a received control message is determined as needed, whereby a dedicated lane is not required for exchange of control messages. An allocation process reserves ports, lanes, and allocated channel time duration (or symbols) on the corresponding lanes. A port includes multiple lanes wherein a forwarding table entry for a particular destination device is in the form of a tuple of (port, lane). Lane assignment is dynamic and there is no dedicated port assigned for data/control communication. As such, the forwarding table includes the number of lane(s) over which data (e.g., packets) are communicated.

According to an embodiment of the invention, a device that is capable of supporting high speed video maintains forwarding information about the port and lane to which a control message, such as a video stream path setup request, should be transmitted on to reach a destination device. The forwarding information may be included as an array in the transmitted control message. The forwarding information may also be maintained in a forwarding table. In one embodiment, a device that is capable of supporting high speed video maintains a forwarding table for isochronous resource allocation including information about the video stream, port number, lane numbers, and channel time unit (or symbols) on the corresponding lane.

A dedicated channel for transmission of control messages is not required. A few port lanes may be selectively used in one direction such that the other remaining lanes on the port may be enabled in a different direction, wherein bi-directional flow of video content within a port is enabled.

According to an example implementation of the invention, a high-speed multimedia interface includes multiple ports. An AV device may have multiple such interfaces or ports. Each port may comprise, for example, one or more twisted pairs or lanes (e.g., physical data communication link or medium). In one example, the number of twisted pairs is fixed to four. In another example the number of lanes is more than four. Each interface may provide a physical connection to enable bi-directional communication of multimedia traffic (compressed and uncompressed AV), control data and bulk data traffic.

FIG. 1 shows a block diagram of a wired video network 10 comprising AV devices 11 (i.e., device X and device Y) connected via a wired communication link 12, according to an embodiment of the invention. The link 12 includes four physical lanes 13 (i.e., Lane 0, . . . , Lane 3) available on a port 14 of device X to a port 15 of device Y. In one example, each lane 13 can be configured either in Transmit (T) mode or in Receive (R) mode. In another example, each lane 13 may be in the T or R mode per packet basis, involving frequent mode changes of the physical (PHY) layer of each device.

An implementation of the first mode wherein each lane 13 can be configured either in Transmit (T) mode or in Receive (R) mode, is described hereinbelow, according to an embodiment of the invention.

Bi-directional Uncompressed Video and Audio Streaming

An example application of said high-speed multimedia is to bi-directionally transmit uncompressed video and audio data from a video source device (e.g., a DVD player) to a video sink device (e.g., a display device such as a television (TV)). In one embodiment of the invention, each lane 13 in FIG. 1 may support 5 Gbps, and total 20 Gbps for data communication over the four lanes. In order to provide bi-directional communication, at most 15 Gbps can be supported in one direction. In one example, video data can have a pixel size of 18, 24, 30, 36, or 48 bits, and video resolution supports VGA (640×480) to 1080p (1920×1080) depending on the display capabilities of the sink device.

In one embodiment, the network 10 in FIG. 1 comprises a switched network that provide bi-directional support for AV streaming such that two out of the four lanes 13 are dynamically configured in the T mode and the other two lanes 13 are configured in the R mode such that simultaneous transmission of AV data between the devices X and Y is enabled. In one embodiment, in a multi-hop scenario such as illustrated by a switched network 20 of serially connected AV devices 11 shown in FIG. 2, there may be one or more switched AV bridge devices 11 connected to the source and sink AV devices 11, wherein both video and audio data from a source device are allowed to pass through the bridge devices 11 before reaching the sink device.

Bulk Data Transfer

In FIG. 1, the lanes 13 used for transferring AV information may also be used for transferring large data files from the source device X to the sink device Y (e.g., destination device). This is achieved by multiplexing AV, control, and data over the lanes 13. For bulk data, USB or Ethernet data packets can be sent directly through the lanes 13. When USB or Ethernet protocol is not available, an application can send data as a generic data packet as well.

Port, Lane, and Channel Time Allocation

Figure 2:
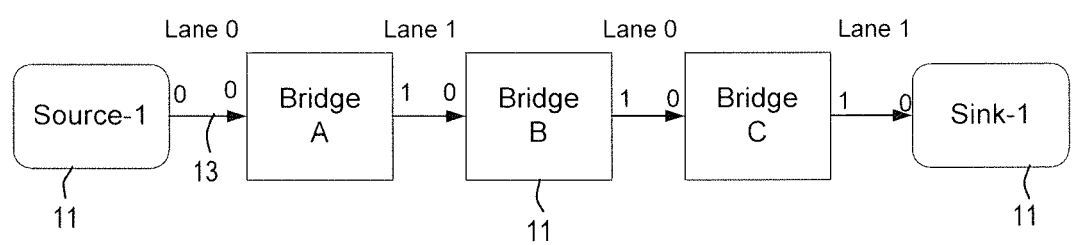
FIG. 2 shows a block diagram of a network of AV devices including a source AV device, one or more bridge AV devices and a destination AV device, implementing isochronous data stream management for audio/video data communication by forwarding control messages from the source AV device to the sink (destination) AV device, according to an embodiment of the invention.

According to an embodiment of the invention, in a multi-hop scenario shown in FIG. 2, before a video data transmission is started, the source and the sink devices 11 negotiate using control messages including allocation messages for port, lane, and symbol time allocation (i.e., time unit or channel time allocation on a lane). The control messages are transmitted on the lanes 13 that are already assigned for the source and the sink devices for transmission of such control messages. In general, other information (e.g., frames/packets including compressed AV, Ethernet/USB frames, management frames, layer 3 (e.g., FIG. 5B), and higher layer packets) may follow similar transmission rules as said control messages.

According to an embodiment of the invention, a layer 2 forwarding table 11E (FIG. 5B) includes two sub-tables: data/control forwarding sub-table and audio/video forwarding sub-table (hereinafter video forwarding sub-table). The data/control forwarding sub-table includes information for forwarding of data/control information (data/control packets), and the video forwarding sub-table includes information for forwarding of audio/video data (e.g., uncompressed video data and audio data packets).

According to an embodiment of the invention, a forwarding table is constructed based on transparent bridging, namely forwarding, filtering, and flooding. In the AV network, an AV device discovers other devices that are reachable on a port by promiscuous listening. Because an AV device uses separate lanes for T and R modes, a different lane is used for transmission of its own frame than the lane used by a nearby AV device for the transmission of its frame. For a destination AV device that does not have an entry in the forwarding table, the received frame is forwarded on all other ports except the incoming port. In one embodiment, one lane is selected for the frame transmission out of several available lanes on a port. Each entry in the forwarding table may have a timer to age the entry and then to delete it from the forwarding table.

The video forwarding sub-table is dynamically updated based on control messages (e.g. video path setup request/response control messages), wherein the AV devices access their respective forwarding tables for AV data transmission. An AV forwarding table is dynamically updated based on control messages, wherein the AV devices access their respective data/control forwarding sub-tables for transmission of the AV data.

Data and Control Message Forwarding

According to an embodiment of the invention, two options for data/control message forwarding are provided as described below.

Option 1: Array of Forwarding Port and Lane

According to Option 1, each control message includes an array of address fields wherein each address field includes a combination of port number and the lane number within the port, such as illustrated by Table 1 below.

TABLE 1

| Array of Port and Lane Numbers | | | | | | | |
|---|---|---|---|---|---|---|---|
| Array Field 0 | | Array Field 1 | | Array Field 2 | | Array Field 3 | |
| Outbound Port | Lane number on the Port | Outbound Port | Lane number on the Port | Outbound Port | Lane number on the Port | Outbound Port | Lane number on the Port |
| 0 | 0 | 1 | 1 | 1 | 0 | 1 | 1 |

An AV device accesses the array in order to determine the port and lane for transmitting a control message. FIG. 2 shows an example control message flow from a source device Source-1 to a sink device Sink-1, wherein each port has at most four lanes. FIG. 2 illustrates information about outbound port, inbound port, and lane number within each port, wherein such information is included in the array of address fields. The example array of address fields in Table 1 above includes four fields for the considered topology in FIG. 2 when a control message traverses from the Source-1 to Sink-1 via the bridge devices 11 (i.e., Bridge A, Bridge B, Bridge C). Specifically, In Table 1, the Array Field 0 corresponds to Source-1, Array Field 1 corresponds to Bridge A, and so on. By accessing Array Field 0, the device Source-1 is informed that the outbound port is port 0 and the corresponding lane is Lane 0. By accessing Array Field 1, the device Bridge A is informed that the outbound port is port 1 and the corresponding lane is Lane 1. By accessing Array Field 2, the device Bridge B is informed that the outbound port is port 1 and the corresponding lane is Lane 0. By accessing Array Field 3, the device Bridge C is informed that the outbound port is port 1 and the corresponding lane is Lane 1.

Figure 3:
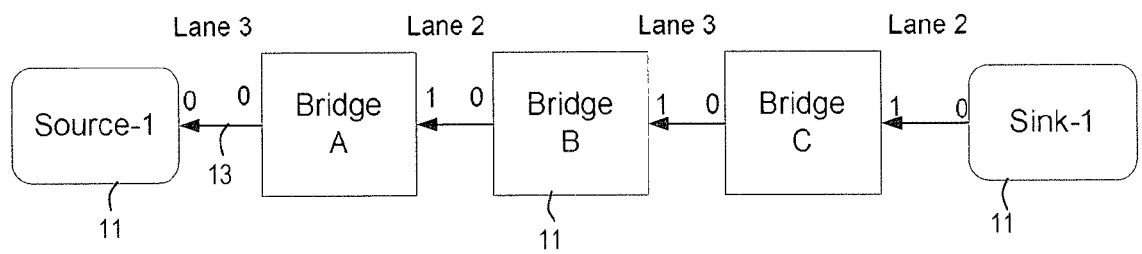
FIG. 3 shows isochronous data stream management for audio/video data communication by forwarding control messages from the sink AV device to the source AV device in the network of FIG. 2, according to an embodiment of the invention.

Similarly, when a control message traverses from device Sink-1 to device Source-1, the array of address fields may have different values corresponding to the network configuration shown in FIG. 3, using the array represented by Table 2 below, according to an embodiment of the invention.

TABLE 2

Array of Port and Lane Numbers

| Array Field 0 | | Array Field 1 | | Array Field 2 | | Array Field 3 | |
|---|---|---|---|---|---|---|---|
| Outbound Port | Lane number on the Port | Outbound Port | Lane number on the Port | Outbound Port | Lane number on the Port | Outbound Port | Lane number on the Port |
| 0 | 2 | 0 | 3 | 0 | 2 | 0 | 3 |

According to embodiments of the invention, the outbound port and lane number information can have different format than the arrays shown in Tables 1 and 2. For example, each array field may be a row of a matrix wherein the outbound ports and lane numbers become columns of the matrix. In this case the source device accesses the first row of the matrix, the next device accesses the second row of the matrix, and so on. A source device uses end-to-end information to populate the array fields, and each device on the multi-hop path accesses and modifies the array as needed.

In another embodiment, the forwarding table may have a default entry for lanes and port for outbound traffic. For example, within a port, default lanes are used for inbound and outbound traffic.

Option 2: Data/Control Message Forwarding Sub-Table

Figure 5A:
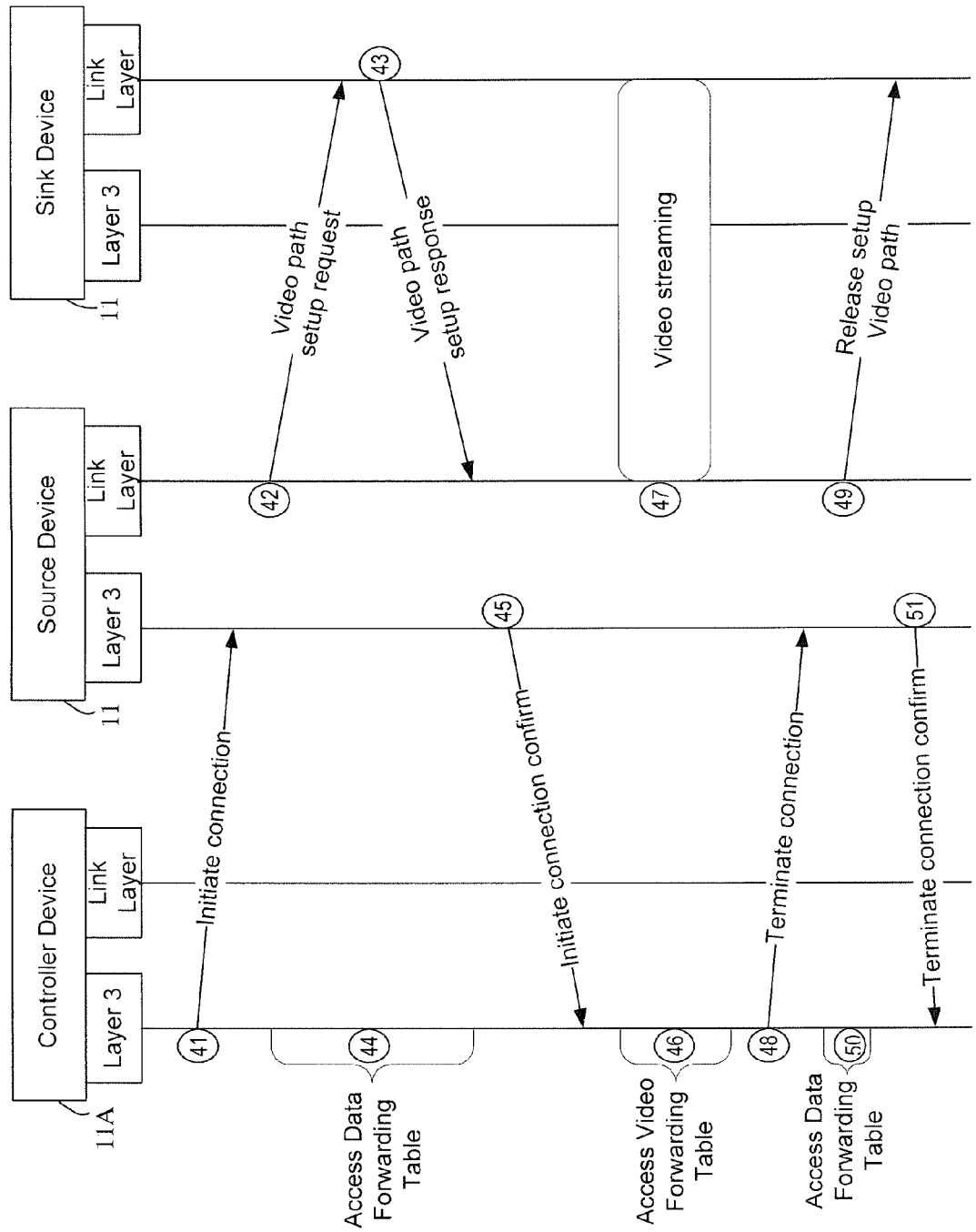
FIG. 5A illustrates a process for isochronous data stream management for audio/video data communication, according to an embodiment of the invention.
Figure 5B:
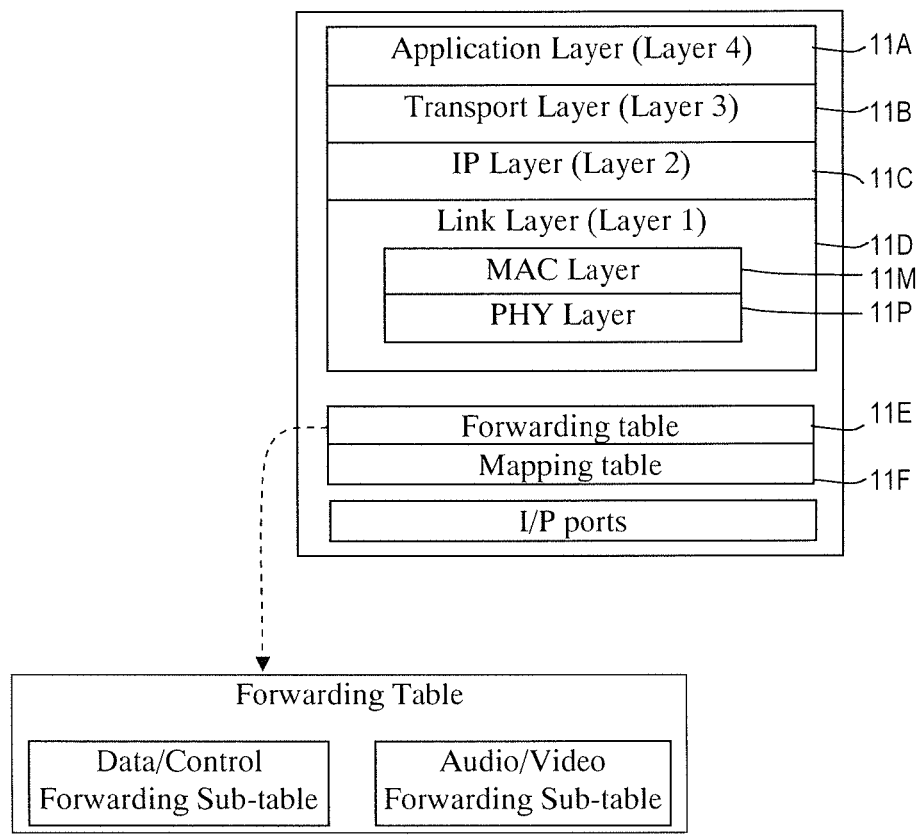
FIG. 5B shows a block diagram of an AV device isochronous data stream management for audio/video data communication, according to an embodiment of the invention.

According to Option 2 for data/control message forwarding, in one embodiment, each device in the AV network 20 includes a data/control forwarding sub-table as a sub-table of the forwarding table 11E (FIG. 5B). A device can access its data/control forwarding sub-table based on the destination of an incoming control message from an upstream device, determine on which port and lane the control message should be transmitted to a downstream (i.e., peer) device. According to an embodiment of the invention, the data/control forwarding sub-table at AV devices in FIGS. 2 and 3 may include entries such as shown by example in Tables 3-7 below. In one implementation, each AV device may share information with its upstream (i.e., peer) device to inform the incoming port and lane for the upstream device. In another implementation, fixed lanes may be used for transmission of control messages.

TABLE 3

Data/control Forwarding sub-table at Source-1

| Destination | Outbound Port | Lane number on the Port |
|---|---|---|
| All destinations | 0 | 0 |

TABLE 4

Data/control Forwarding sub-table at AV Bridge Device A

| Destination | Outbound Port | Lane number on the Port |
|---|---|---|
| Source-1 | 0 | 3 |
| B, C, Sink-1 | 1 | 1 |

TABLE 5

Data/control Forwarding sub-table at AV Bridge Device B

| Destination | Outbound Port | Lane number on the Port |
|---|---|---|
| Souce-1, A | 0 | 2 |
| C & Sink-1 | 1 | 0 |

TABLE 6

Data/control Forwarding sub-table at AV Bridge Device C

| Destination | Outbound Port | Lane number on the Port |
|---|---|---|
| Souce-1, A, B | 0 | 3 |
| Sink-1 | 1 | 1 |

TABLE 7

Data/control Forwarding sub-table at Sink-1

| Destination | Outbound Port | Lane number on the Port |
|---|---|---|
| All destinations | 0 | 2 |

Mapping Table

According to an embodiment of the invention, video data transmission involves end-to-end resource allocation (e.g., ports, lanes, communication link channel time) between a source device and a sink device. For example, in FIG. 2, Source-1 to Sink-1 video data transmission requires allocation of ports, lanes, and channel time. The various ports and lanes may be dynamically configured, such that the resource allocation enables configuration of lanes in terms of T and R modes described above. Moreover, the channel time on a lane may be multiplexed among multiple streams. In this way, the channel time on each lane can be shared among multiple streams.

Figure 4B:
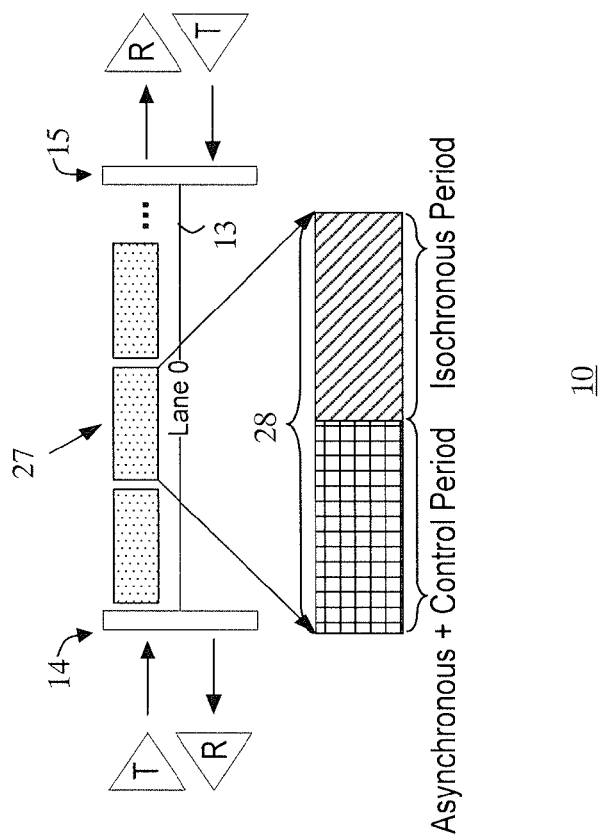
FIGS. 4A-4B show allocation of communication channel time for isochronous data stream management for audio/video data communication, according to an embodiment of the invention.
Figure 4A:
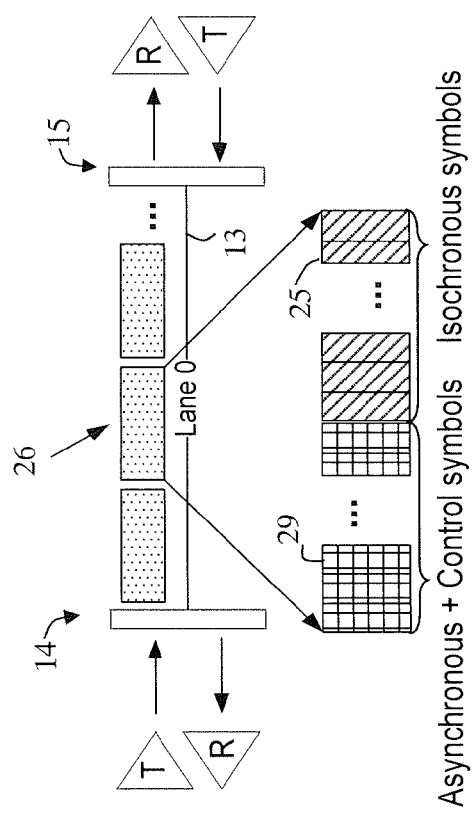

Referring to FIG. 4A, according to an embodiment of the invention, channel time may be divided into units for transmission of multiple fixed length packets. In such a case, channel time is allocated in terms of asynchronous control symbols 29, and isochronous symbols 25 within such fixed length packets 26 (e.g., transport packets), for isochronous channel time. FIG. 4A shows the case of channel time for isochronous streams in terms of symbols 25 within a transport packet. According to an embodiment of the invention, channel time may be represented as a contiguous contention free period 28 on the channel, as shown by example in FIG. 4B, illustrating isochronous channel time allocation. FIG. 4B shows superframe based time allocation, wherein each superframe 27 that occurs on a periodic basis, includes contention free periods 28. Each period 28 comprises an asynchronous control period and an isochronous period. Only activity on Lane 0 is illustrated in FIGS. 4A-4B, however, other lanes existing on a port may follow the same implementation.

According to an embodiment of the invention, in an AV network the source device 11 (e.g., Source-1) is preferred to initiate a video path setup request (control message) as it has accurate information about the bandwidth requirement of an isochronous stream. The video path setup request includes a stream or sequence number to distinguish different video path setup requests generated by the source device. In one embodiment, the stream or sequence number may be maintained as a 16-bit or 32-bit counter in the source device such that each new video path setup request initiated by the source device has a different value. Each AV device 11 in the video network maintains the stream index that can be represented as a combination of {Source address, Destination address, MAC address of the device initiating the video-path-setup request, and stream number or sequence number}, wherein MAC comprises medium access control information. Based on these values, each AV device 11 can distinguish between different stream indices. The stream index is a local variable in each AV device that is not shared with other AV devices in the AV network. According to an embodiment of the invention, a mapping table 11F (FIG. 5B) may be used for maintaining the stream index, as shown by example Table 8 below.

TABLE 8

Mapping Table

Isochronous Stream Details (from the control message)

| Stream Index | Source Address | Destination Address | MAC address of the device initiated the video_path_setup_Request | Sequence number or stream number |
|---|---|---|---|---|
| a | X | Y | X | n |
| b | U | R | R | k |
| ... | ... | ... | ... | ... |

Further, as shown by the example Table 9 below, a mapping table for an AV device (i.e., devices 11 in FIG. 2) may have entries based on Source-1 initiating a video-path-setup request and setting the sequence or stream number field set to S.

TABLE 9

Mapping Table

Isochronous Stream Details (from the control message)

| Stream Index | Source Address | Destination Address | MAC address of the device initiated the video_path_setup_Request | Sequence number or stream number |
|---|---|---|---|---|
| 0 | Source-1 | Sink-1 | Source-1 | S |

AV Forwarding Sub-Table

According to an embodiment of the invention, a video forwarding sub-table at each AV device includes information for forwarding of uncompressed audio/video data messages (packets) between AV devices in the AV network. Example video forwarding sub-tables 10-13 below illustrate allocated resources at various AV devices in the network shown in FIG. 2. For illustration purposes it is assumed that embodiments of the invention make use of symbol based bandwidth allocation as in FIG. 4A.

TABLE 10

Video Forwarding sub-table indicating resource allocation at Source-1

| Stream Index | Outbound Port | Lane number on the Port | Allocated TU |
|---|---|---|---|
| i | 0 | 0 | Symbols j 1 ... N symbols are free for allocations, j, k, m < N |
|  |  | 2 | Symbols k |

TABLE 11

Video Forwarding sub-table indicating resource allocation at AV Bridge Device A

| Stream Index | Outbound Port | Lane number on the Port | Allocated TU |
|---|---|---|---|
| i | 1 | 1 | Symbols j |
|  |  | 3 | Symbols k |

TABLE 12

Video Forwarding sub-table indicating resource allocation at AV Bridge Device B

| Stream Index | Outbound Port | Lane number on the Port | Allocated TU |
|---|---|---|---|
| i | 0 | 0 | Symbols j |
|  |  | 2 | Symbols k |

TABLE 13

Video Forwarding sub-table indicating resource allocation at AV Bridge Device C

| Stream Index | Outbound Port | Lane number on the Port | Allocated TU |
|---|---|---|---|
| i | 1 | 0 | Symbols m |

Similarly, other AV devices on the video path between Source-1 and Sink-1 maintain inbound information in the video forwarding sub-table.

FIG. 5A illustrates an AV network including an AV device, a sink AV device, and a controller module/device. According to embodiments of the invention, the controller module/device may be a separate AV device (as shown), or a maybe a component of one of the AV devices (such as the source device or the sink device). In one embodiment, an AV device may comprise a consumer electronic device, a personal computer, a mobile device, etc., referred herein collectively as an AV device. Each such AV device may comprise one or more of: a connection set-up module, a stream management module, a communication module, processor, memory, input/output ports, display monitor, user interface, etc. The AV devices may be connected via a network of wired communication links comprising (physical) lanes selectively connected between ports of the devices.

Referring to the block diagram in FIG. 5B, one embodiment an AV device (e.g., AV devices 11) comprises an Application Layer (Layer 4) 11A including processes that use the network, a Transport or TCP Layer (Layer 3) 11B including processes that provide end-to-end data delivery, an IP Layer or Network/Internet Layer (Layer 2) 11C including processes handling routing of data, and a Link Layer comprising physical and data link sub-layers (Layer 1) 11D including processes for accessing physical communication medium. These layers are based on TCP/IP layers which can be loosely mapped to the Open System Architecture (OSI). The data link sub-layer of the Link Layer includes a MAC layer 11M and a PHY layer 11P, configured for communication over an AV wired network, according to embodiments of the invention.

FIG. 5A further illustrates a video stream path set up process according to an embodiment of the invention. In process block 41, isochronous video stream connection set up begins when a stream controller device 11A transmits an Initiate connection control message that may be transmitted over layer 3 (FIG. 5B). Upon receiving the Initiate connection control message, in process block 42 a Source device in turn sends a Video path setup request control message to a sink device. Video path setup related control messages include various fields such as: {source address, destination address, Sequence number/stream number, Request Bandwidth Request, Time To Live (TTL), etc.}. In process block 43, the Sink device sends a Video path setup response control message to the Source device. The response indicates if the video path setup request is successful and the reason if the video path setup request failed. In process block 44, the controller device accesses a data/control forwarding sub-table (FIG. 5B) to determine forwarding information for the control message. In process block 45 the Source device sends an Initiate connection confirmation control message to the controller device.

Once a video stream is established, in process block 46 a video forwarding sub-table is accessed for switching and forwarding of uncompressed video data. In process block 47, each AV device can appropriately forward received video data on a corresponding port and lane to its downstream device. In one embodiment, the uncompressed video frames do not contain source and destination addresses such that the received video data is correctly forwarded on the downstream port based on the video forwarding sub-table. The video forwarding sub-table entries remain valid until a video-path setup control message with the matching sequence number is received to delete the allocation.

In process block 48, the controller device terminates the connection by sending a Terminate connection control message on Layer 3 (FIG. 5B), that is followed in process block 49 by a Layer 2 (FIG. 5B). Release setup video path control message from the Source device to release the allocated resources for the video stream. In process block 50 a data/control forwarding sub-table is accessed to determine forwarding of the control message and in process block 51 the source device sends a Terminate connection confirmation control message to the controller device. In one embodiment, the data/control forwarding sub-tables (e.g., Tables 3-7 above) are used to determine the outbound port and lanes based on the destination address in the control messages for forwarding control messages.

Figure 6A:
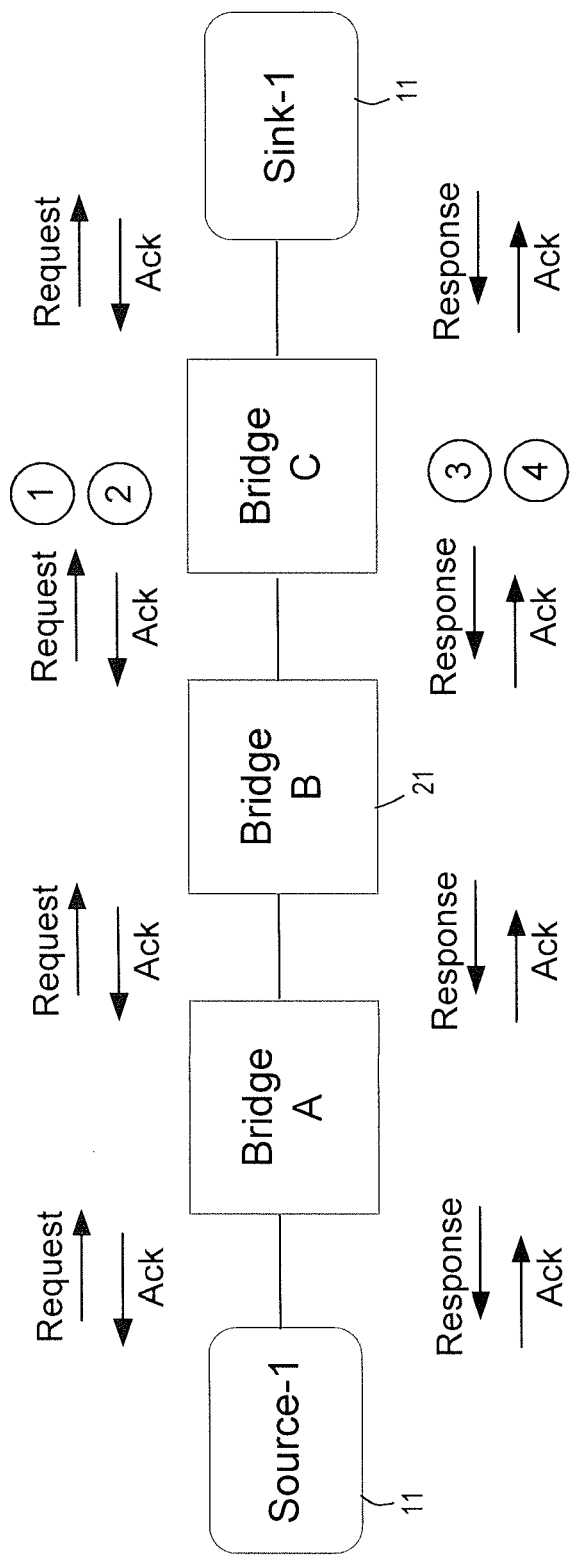
FIG. 6A shows a block diagram of a network of AV devices including a source AV device, one or more bridge AV devices and a destination AV device, implementing isochronous data stream management for audio/video data communication by forwarding control messages from the source AV device to the sink (destination) AV device, according to an embodiment of the invention.

FIG. 6A shows an example video path setup request and response control message sequence in the AV network 20 based on the above process 40 for video transmission from Source-1 to Sink-1, according to an embodiment of the invention. As shown in FIG. 6A, before a forwarding AV device (e.g., Bridge B) forwards a video path setup request control message from an upstream (previous hop) AV device (e.g., Bridge A) to a downstream (next hop) AV device (e.g., Bridge C), the forwarding AV device determines if a requested video transmission bandwidth can be satisfied. If the requested bandwidth can satisfied, then the forwarding AV device sends an acknowledgment (Ack) control message to the upstream AV device. Otherwise, the forwarding AV device sends a Nack (i.e., not Ack) control message to its upstream AV device that eventually reaches the source device (e.g., Source-1), as illustrated in FIG. 6A. The Nack message may optionally include an alternative suggested bandwidth that is lower than the originally requested one.

Once the request control message successfully reaches the destination device (e.g., Sink-1), a response control message is transmitted back to the source device. The response message is forwarded hop-by-hop starting from the destination device, as illustrated in FIG. 6A. In one example, Source-1 that initiates a video-path setup request control command and Sink-1 is the device that initiates the video-path setup response control command. AV bridges devices A, B, and C participate in forwarding the setup request and response control messages. On each AV device, the response message is replied with an Ack message that includes the outbound port resource allocation on the AV device that transmitted the Ack message.

The AV device that transmitted the video setup response control message upon receiving the resource allocation embedded in the Ack response control message, updates its video forwarding sub-table for both inbound and outbound ports related to the video stream. As discussed above, the stream index field is not shared with a peer AV device and instead the detailed mapping fields such as {Source address and Destination address, (address of the device that initiated the video-path-setup request & sequence/stream number)} are used. FIG. 6A illustrates the sequence of control messages 1, 2, 3, and 4 between devices B and C when both the request and response control messages are successful.

Figure 6B:
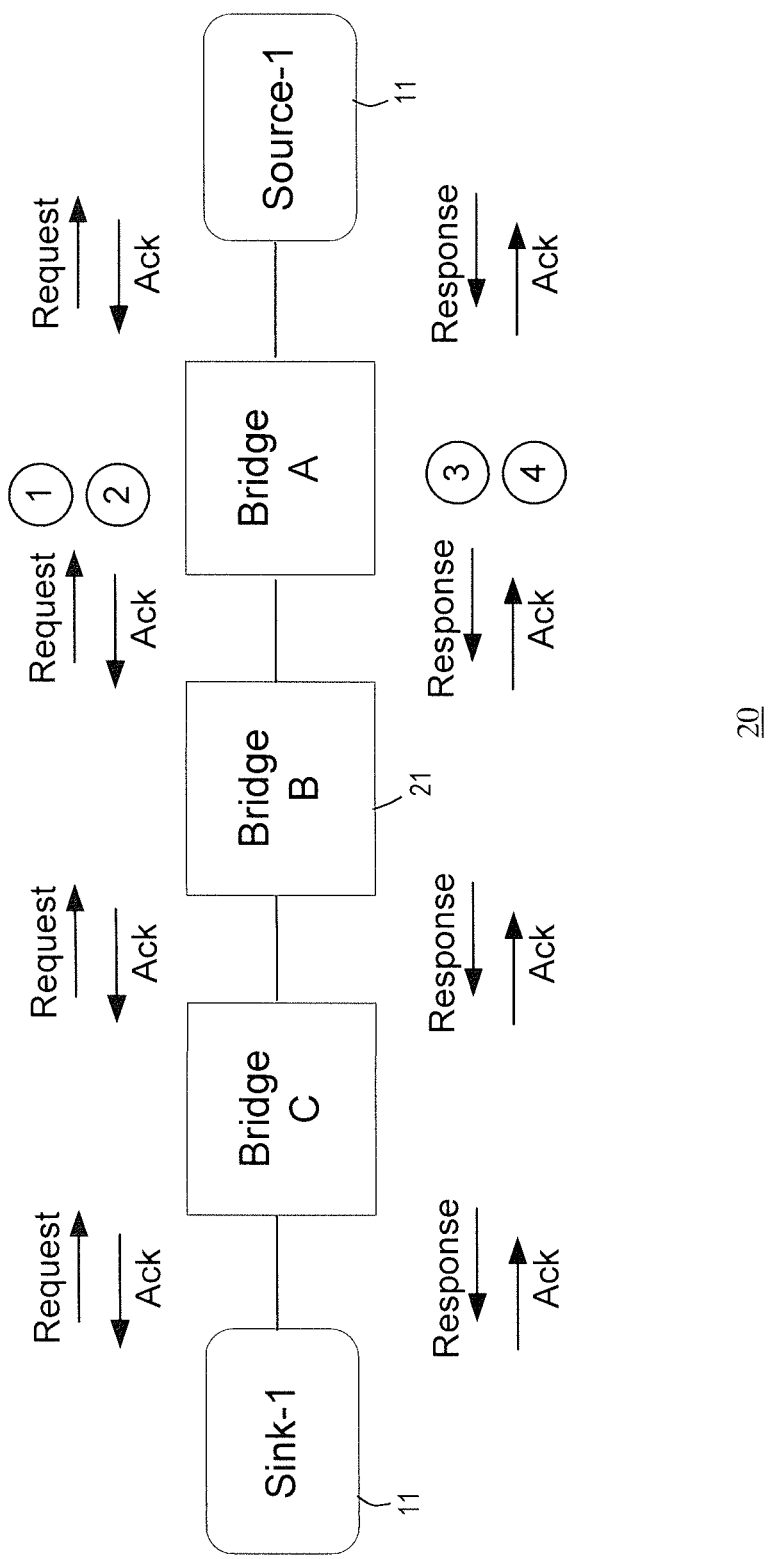
FIG. 6B shows isochronous data stream management for audio/video data communication by forwarding control messages from the sink AV device to the source AV device in the network of FIG. 6A, according to an embodiment of the invention.

Similarly, FIG. 6B shows an example video path setup request and response control message sequence in the AV network 20 based on the above process 40 for video transmission from Sink-1 to Source-1, according to an embodiment of the invention. As such, FIGS. 6A-6B illustrate bi-directional video transmission between source and sink AV devices according to embodiments of the invention.

Figure 7:
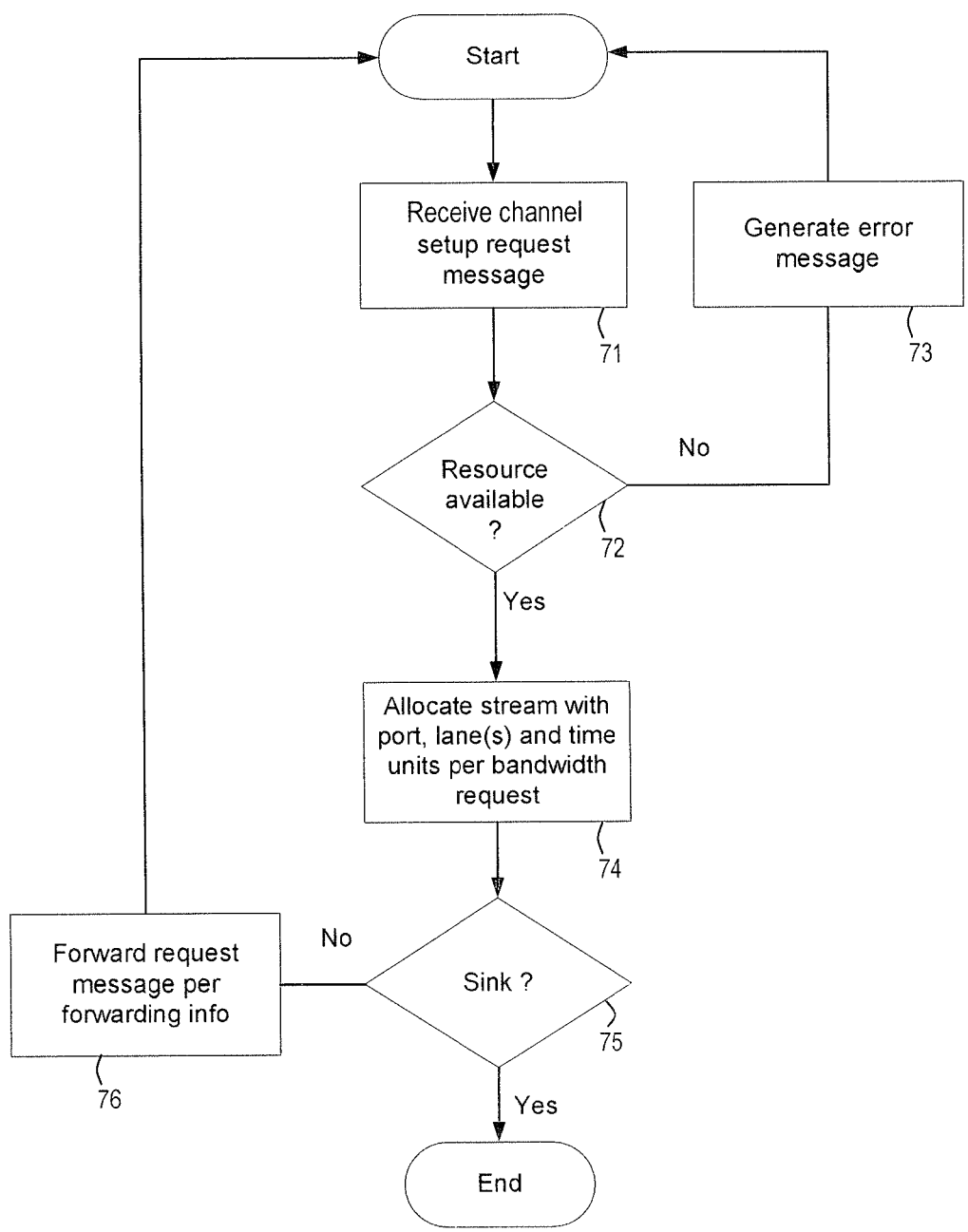
FIG. 7 shows a video stream path setup request process in an AV network implementing isochronous data stream management for audio/video data communication, according to an embodiment of the invention.
Figure 8:
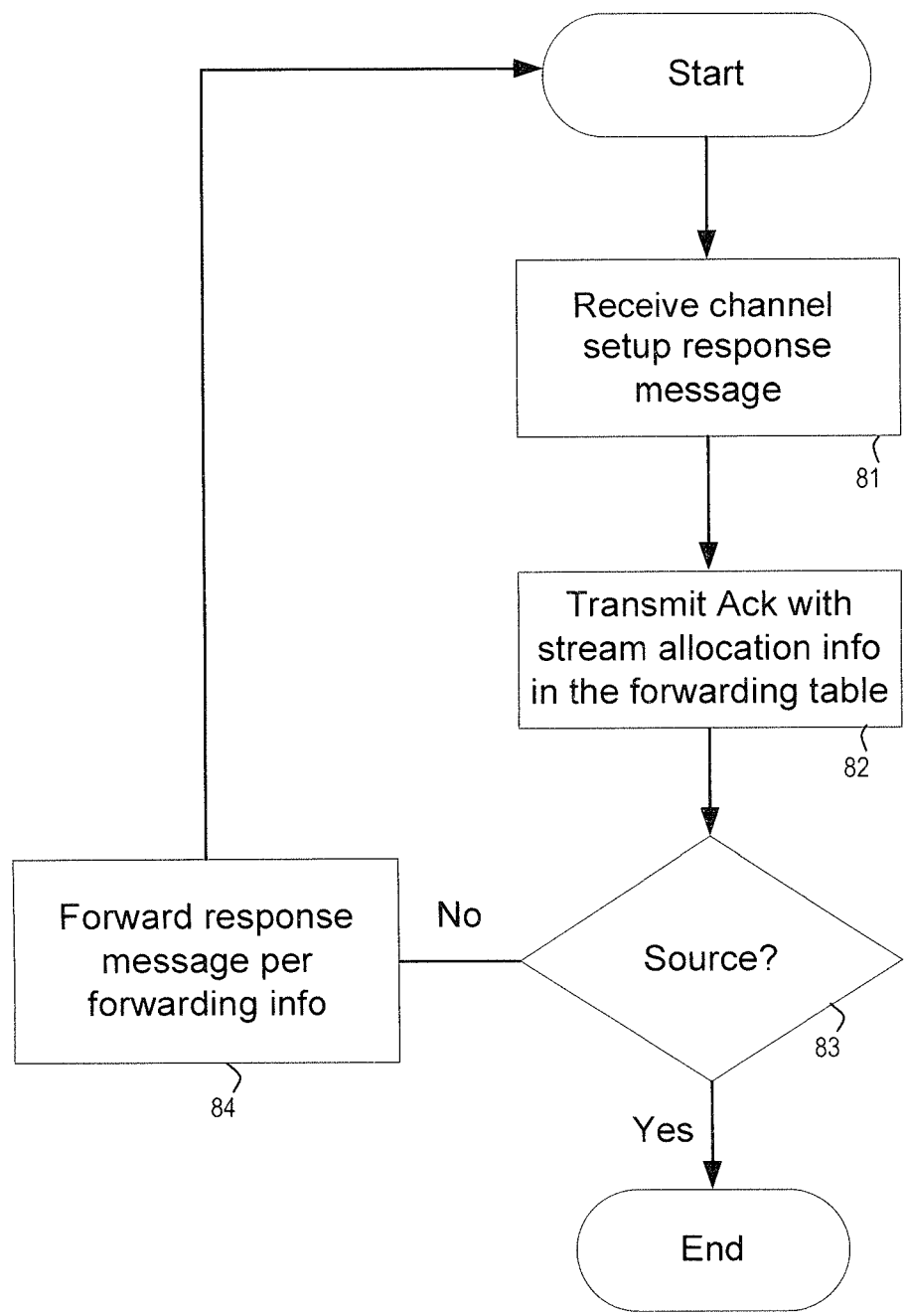
FIG. 8 shows a video stream path setup response process in an AV network implementing isochronous data stream management for audio/video data communication, according to an embodiment of the invention.

Referring to processes in FIGS. 7-8, a video stream path from a source AV device to a destination (sink) AV device is established via the lanes 13 between the AV devices in the AV network, according to an embodiment of the invention. FIG. 7 shows a video stream path setup request process 70 in an AV network, according to an embodiment of the invention. In process block 71, a request control message comprising a channel setup request to setup an AV stream is received from an upstream AV device. In process block 72, it is determined if resources (e.g., port, lane(s) time units per the bandwidth request) to satisfy a requested stream bandwidth are available. If sufficient resources are not available, in process block 73 a response error message is generated and the process proceeds to block 71. If sufficient resources are available, in process block 74 resources are allocated. In process block 75, if the recipient of the channel setup request control message is a destination (sink) AV device, then the process terminates, otherwise in process block 76 the request control message is forwarded to a downstream AV device using data/control forwarding sub-table information. A video stream path setup response process corresponding to the above video stream path setup request process is described below.

FIG. 8 shows a video stream path setup response process 80 in an AV network, according to an embodiment of the invention. In process block 81, a channel setup response control message is generated in response to a video path setup request control message received from an upstream AV device. In process block 82, an Ack control message including video stream allocation information from a data/control forwarding sub-table is transmitted to the upstream AV device. In process block 83, if the receiving AV device is a source AV device, the process terminates. Otherwise, in process block 84, the response control message is sequentially forwarded to upstream AV devices in the video stream path based on forwarding information in respective data/control forwarding sub-table of each AV device in the path.

As such, a video stream path from a source AV device to a destination (sink) AV device is established via the lanes 13 between the AV devices in the AV network, according to an embodiment of the invention. According to the embodiments of the invention, the video streaming processes described herein include transmission of not only video data, but also audio data along with the video data. Embodiments of isochronous data stream management (such as processes described above in relation to in FIGS. 2-5A and FIGS. 6-8), may be implemented as data stream management modules in the MAC layers of the AV devices 11, according to embodiments of the invention.

Connection Set-up

FIG. 9 shows an AV network 90 referred to herein as Room-to-room Unified Bi-directional Interface (RUBI) comprising switched AV bridge devices 11 (e.g., RUBI Devices A and B) serially connected with an AV source device 11 (e.g., RDA-SRC) and an AV sink device 11(e.g., RDA-SNK), according to an embodiment of the invention. Each AV device 11 has a unique MAC address referred as RUBI Device Address (RDA). An AV port supports multiple lanes as shown in FIG. 1. In one embodiment of the invention, multiple stream source modules (e.g., Stream Src-0, Stream Src-1, etc.) may be included in an AV source device and/or multiple stream sink modules (e.g., Stream Sink-0, Stream Sink-1, etc.) available may be included in an AV sink device.

AV devices can support a variable number of lanes, and typically an AV bridge device supports at least same or more lanes than an AV source device or AV sink device. FIG. 10 shows a more detailed block diagram of a switched AV bridge device 11, comprising one or more AV ports and one or more Ethernet ports.

Figure 11:
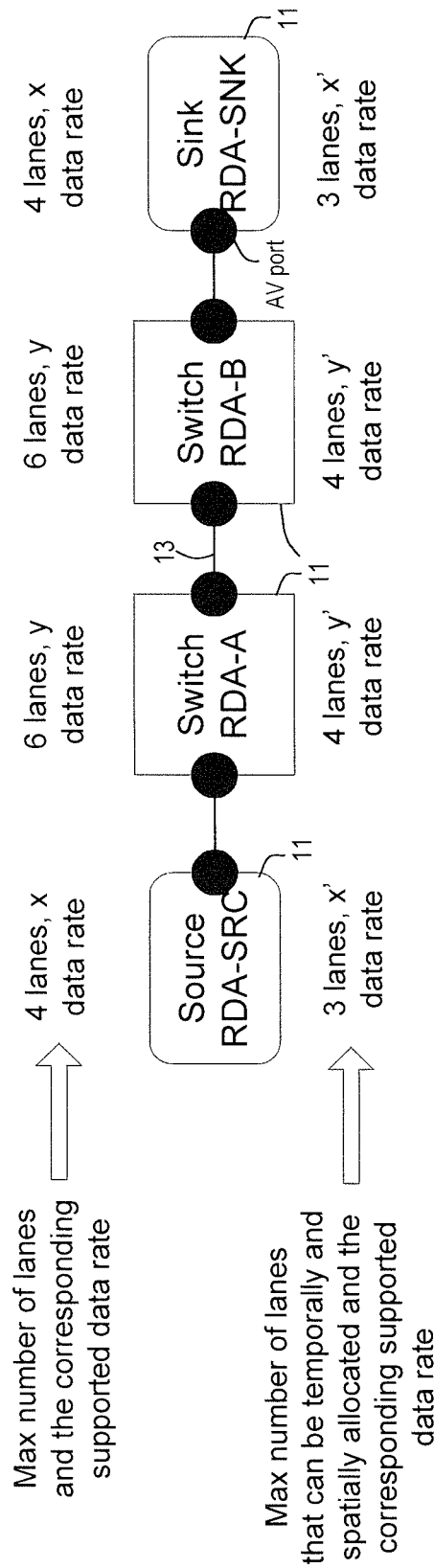
FIG. 11 shows example communication bandwidth availability per communication link in the AV network of FIG. 9, according to an embodiment of the invention.

In one embodiment, the AV devices 11 can have a variable number of lanes per port. As shown in FIG. 11, in one example both RDA-SRC and RDA-SNK devices support four lanes each, and the RDA-A and RDA-B devices support six lanes each. However, given that at least one lane is required to support bi-directional data traffic flow between RDA-SRC and RDA-SNK devices (e.g., for flow of data from the sink to the source). Therefore, in one example, the data flow from RDA-SRC and RDA-SNK devices can only support at most three lanes each and the RDA-A and RDA-B devices support five lanes each.

FIG. 11 further illustrates an example of the maximum number of lanes/data rate and available lanes/data rate corresponding to the network 90 shown in FIG. 9. The example in FIG. 11 presents the maximum data rate supported on each communication link 13 between a pair of AV devices, without considering any resource allocation as well as channel allocation for control data traffic from the source device RDA-SRC to the sink device RDA-SNK, and vice-versa. Since at least one lane of a communication link 13 is used for the flow of data from sink device RDA-SNK to the source device RDA-SRC, the source and the sink devices support three lanes. However, there may be other data flow from switched bridge RDA-B to switched bridge RDA-A, thus the total number of lanes available from RDA-B to RDA-A is 4 lanes. In this example allocation, the maximum available data rate supported on each link is lower than the static case.

In one embodiment, a connection setup process between the AV source device to the AV sink device may include the following sub-processes (or sub-modules) as noted above. Each sub-process can be executed independent of the other sub-processes, wherein the relative order of the sub-processes can be changed. In one embodiment, to reduce the time in setting up the connection, certain sub-processes can be combined together or skipped altogether. In general, the control point that triggers the initiation of these processes may reside at the transport layer 11B (layer 3) of an AV device 11 (FIG. 5B), which may coincide with the AV source device according to one embodiment of the invention.

Sub-process-1: Per Hop Control Messages

Figure 12:
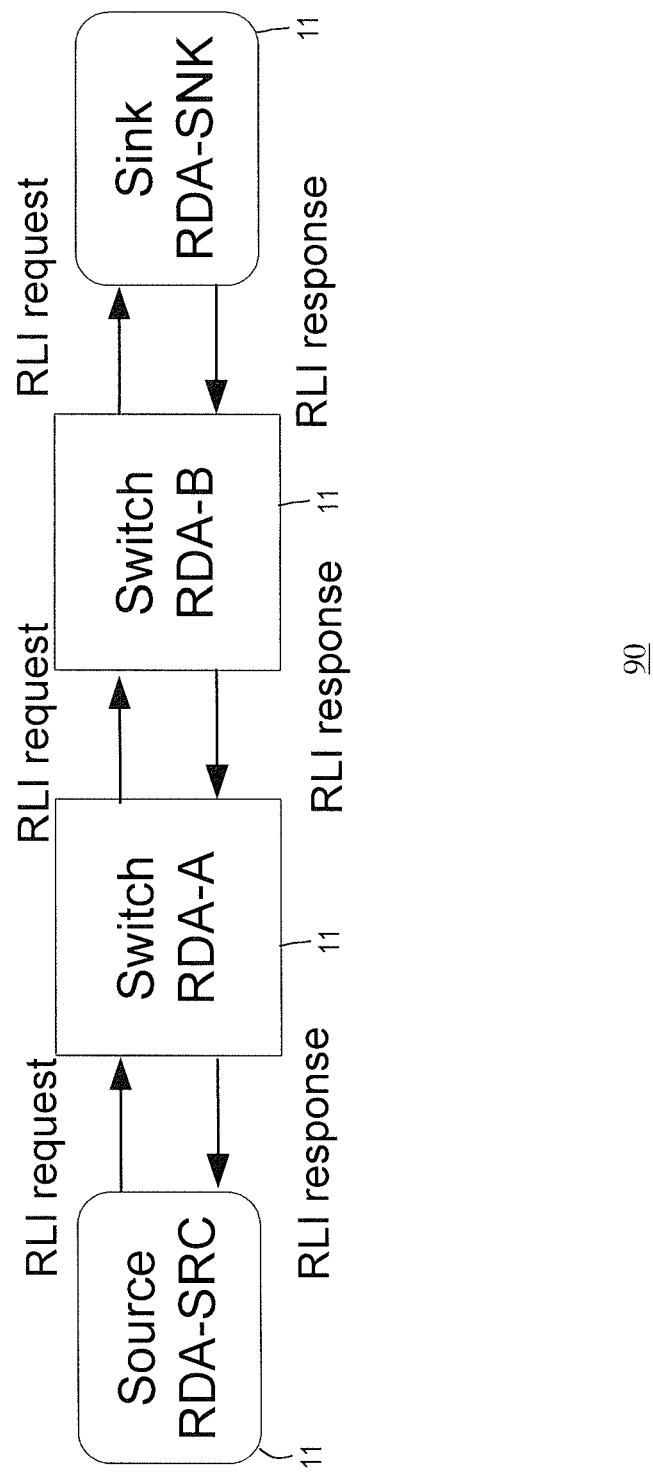
FIG. 12 shows control message flow for establishing isochronous stream communication from an AV source device to an AV sink device via one or more AV bridge devices, according to an embodiment of the invention.

FIG. 12 shows control message flow in the network 90, according to an embodiment of the invention, for establishing isochronous stream communication from the AV source device to the AV sink device via one or more AV bridge devices. The AV source device initiates the transmission of a link layer control messages (control packets) that captures the number of lanes available per hop. Specifically, FIG. 12 illustrates flow of per hop RUBI Lane Information (RLI) control massages including request and response control message. An RLI request message from the AV source device includes RLI data, addresses for RDA-SRC, RDA-SNK, and a unique stream index or a transaction identifier.

Figure 14:
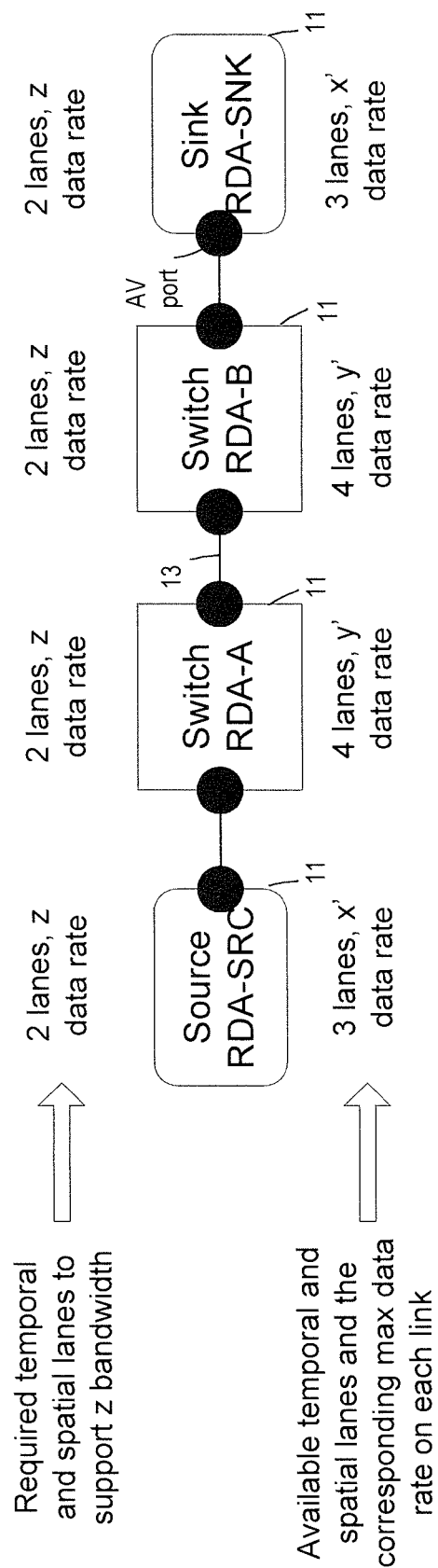
FIG. 14 shows example communication bandwidth availability per communication link in the AV network of FIG. 9, according to an embodiment of the invention.

In one implementation, an RLI request message from the AV source device includes RLI data in the form of an array. Referring to FIG. 14, for example, the RLI data may be represented as {(3,x'), (4,y'), (4,y'), (3,x')}, wherein each field of the array represents two fields as number of temporally and spatially available lanes and data rate (spatial means physically separate lanes, whereas temporal means communication channel time can be multiplexed among multiple streams on a single lane of a communication link 13). Both temporally and spatially available lanes are included in the RLI data. In one embodiment, additional bits can be used to identify which lanes are temporal and which lanes are spatial. To reduce the number of bits indicating the data rate, such information may be represented as an index bit.

An RLI response message from the AV sink device includes RLI data in the form of an array. Similar to the RLI request message, the RLI response message includes RLI data, RDA-SRC and RDA-SNK information, and the stream index or transaction identifier copied from the RLI request message.

In one embodiment of the invention, the RLI data represents the maximum data rate supported from the RDA-SRC to the RDA-SNK. Thus, on each communication link 13, the connected AV device compares the available supported isochronous data rate ($BW_{link}$) against the maximum supported data rate ($BW_{e2e}$) over the previous communication links (or hops). If the maximum data rate supported on a communication link is less than the maximum supported data rate so far over all the previous communication links, then the maximum supported data rate is updated with the maximum supported data rate over this link (i.e., if $BW_{link} < BW_{e2e}$ then $BW_{e2e} = BW_{link}$).

On the other hand if the maximum supported data rate on a communication link 13 is greater than the maximum supported data rate over all the previous communication links, then no changes are made to the maximum supported data rate end-to-end (i.e., if $BW_{link} > BW_{e2e}$ then $BW_{e2e}$ is i not changed). For example, when the RLI request message arrives at RDA-B, the RLI data field ($BW_{e2e}$) is set to x' and y' is the maximum supported data rate over the communication link from 13 RDA-A to RDA-B ($BW_{link}$). Since x'<y', no changes are made to the minimum supported data rate ($BW_{e2}$). Once the RLI request message reaches the sink device RDA-SNK, the sink device replies with the minimum data rate supported from RDA-SRC to RDA-SNK as x'. Thus, $RLI_{Path}$ would be x'.

In another embodiment of the invention, RLI data represents the maximum number of temporal and spatial lanes that are available and the corresponding data rates from the source device to the sink device. In such a case, the RLI response message would not contain an array of RLI, instead one single field as $RLI_{Path}$. In the above example, the $RLI_{Path}$ would be (3, x').

In another embodiment of the invention, if the amount of ensuing bandwidth request is known, then at each hop it is determined whether the given amount of bandwidth is satisfied or not. If said bandwidth is satisfied, then a bit field in the RLI request message is set to one, otherwise it is set to zero. In this way on each hop (bridge device) it is determined whether there are sufficient temporal and spatial lanes available. In this case when any AV device on the path from the AV source device to the AV sink device determines that the ensuing bandwidth cannot be satisfied, then a negative response is sent back to the AV source device.

In yet another embodiment of the invention, when the amount of the ensuing bandwidth is known, the RLI request message may include the minimum number of lanes required to satisfy the bandwidth request. If a link is not already trained then the RLI request message may include the maximum number of temporal and spatial lanes available for that hop.

The flow of control messages comprising the RLI messages occurs on the default lanes as shown in FIG. 12. The messages include source address (SA) and destination address (DA) fields. In one embodiment, the SA and DA fields are set to the MAC addresses of AV devices on a single hop. The messages also include Stream Source Address (SSrA) and Stream Sink Address (SSiA) fields. For the case of RLI request message flow on link RDA-A to RDA-B, the SA is set to RDA-A, DA is set to RDA-B, SSrA is set to RDA-SRC and SSiA is set to RDS-SNK. At each hop, the SA and DA addresses are updated such that the massage can be forwarded to the next device on the path to the RDA-SNK.

In another embodiment, the SA and DA are set to the original source device and the final sink device in the AV network, and each AV device on the path therebetween forwards a message based on a destination address lookup in its forwarding table, as described further above. The DA field is not set to any of the intermediate AV bridge devices (intermediate nodes). However, each intermediate node processes the received RLI request message. This is achieved by implementing a rule requiring that when the type of a designated field in the RLI request message indicates an RLI request, all intermediate devices in the path process the RLI request message irrespective of the case that the DA of the message does not match the MAC address of the intermediate device. For example, if the DA and SA are set to RDA-SNK and RDA-SRC, respectively, all intermediate bridge devices process this RLI request message.

In another embodiment, instead of the flow of the control message from the source to the sink device, the source device may query a controller device to determine the $RL_{Path}$ as described above. Assuming that the controller device maintains the allocation of lanes per hop basis in the AV network, then the $RLI_{Path}$ can be obtained from the controller device. In this case, the SA is set to RDA-SRC and DA is set to RDA-COD, which is the RDA of the controller device (coordinator).

Two additional fields in the RLI request message may indicate the RDA-SRC and RDA-SNK. Further, the RDA-SRC can be eliminated when the request is always initiated by the stream source device that coincides with the SA field of the RLI request message. Intermediate AV devices (nodes) do not process either the RLI request messages or the response RLI request messages. A transaction identifier is set to the RDA-SRC in the RLI request message and copied by the coordinator in the RLI response message. In this stage, and when a link is not trained, the RLI may be estimated based on the corresponding lanes in low, medium or high bit rate quality.

Sub-process-2: Capability Information Control Messages

According to an embodiment of the invention, an AV source device RDA-SRC in FIG. 11 sends a capability information control message requesting the AV sink device RDA-SNK to determine a capability of the stream sink device RDA-SNK, such as a display capability of the sink device RDA-SNK. In cases where more than one stream sink modules are available at the RDA-SNK device, the AV source device may either query for all stream sink modules or a specific stream sink module. The capability information control message includes a field to indicate such information.

In one embodiment, the response of the AV sink device to the capability information control message includes the AV format such as RGB or YCbCr, etc. The color depth, E-EDID, aspect ratio, 3D capability, refresh rate, any vendor specific information, etc. In one embodiment, the response to the capability information control message may also indicate the video buffer at the stream sink.

Figure 13:
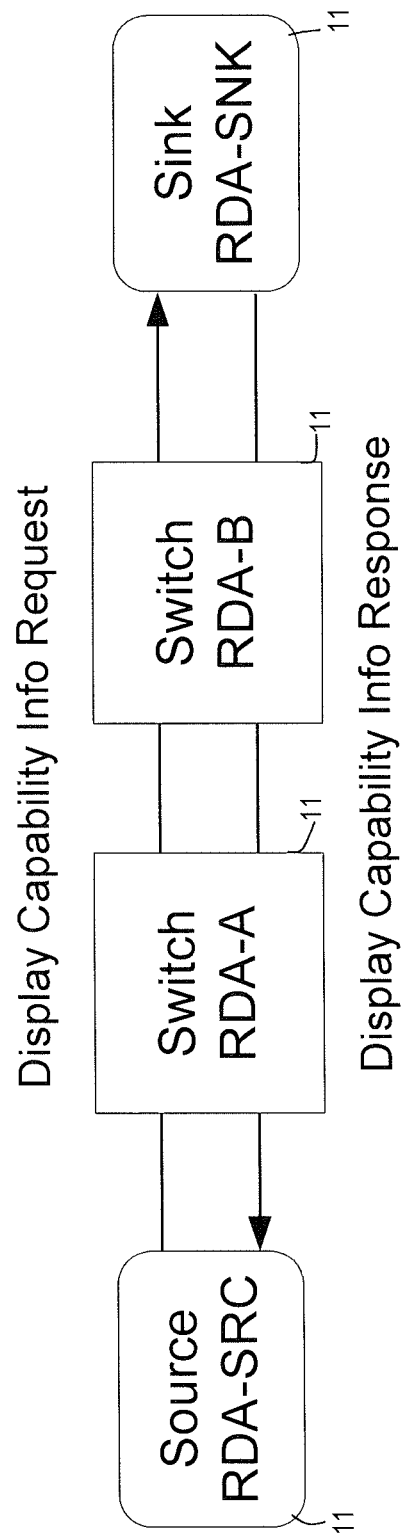
FIG. 13 shows control message flow for determining capability information of the AV sink device, according to an embodiment of the invention.

The initiation of capability information request and response control message may be from the layer 3 or a higher layer (such as Get AV Capability and Set AV Capability) of the source and the sink devices. As shown by example in FIG. 13, using layer 2 of the AV devices in the network 90, the capability information control messages (e.g., Display Capability Info Request and Response messages) are transmitted on the default lanes, according to an embodiment of the invention. The control messages include the source address (SA) and destination address (DA) fields. The SA and DA fields are set to RDA-SRC and RDA-SNK, respectively. A type field in the control messages is set to indicate the Display Capability Info Request and Reply messages.

In another embodiment, instead of the flow of the control messages from the AV source device to the AV sink device, the AV source device may query a controller device (coordinator) to determine the Display Capability Info of a stream sink. Assuming that the controller device maintains the display capability of all stream sinks at all AV sink devices in the AV network, the controller device replies with the capability of the requested stream sink. In this case, the SA is set to RDA-SRC and the DA is set to RDA-COD, which is the RDA of the controller device. A message field indicates RDA-SNK and an identifier for a stream sink. In another embodiment, the source device may request for a stream sink that can appropriately display the ensuing isochronous stream.

Sub-process-3: Link Training

According to an embodiment of the invention, connection set up includes communication link initialization (before transporting a stream), which is performed unless the lanes from the AV source device to the AV sink device are already in synchronization as indicated in a Link Status field maintained by individual devices in the AV network. As shown by example in FIG. 14, according to an embodiment of the invention, during link initialization in the AV network 90, the default lanes are used to train the other lanes with a desired set of link configuration parameters. In general, link training encompasses tasks to enable clock recovery and channel equalization.

FIG. 14 illustrates available bandwidth and the maximum supported data rate end-to-end. A lane can be in one of the three data rate states depending on the link training The three states may be: high bit rate (hbr), medium bit rate (mbr) and low bit rate (lbr). In another embodiment, there are only two states such as hbr and lbr. FIG. 14 further illustrates the available temporal and spatial lanes and the corresponding supported data rate on each hop and the temporal and spatial lanes required to support z amount of bandwidth, in a network according to an embodiment of the invention.

Partial progressive link training mode

Figure 15:
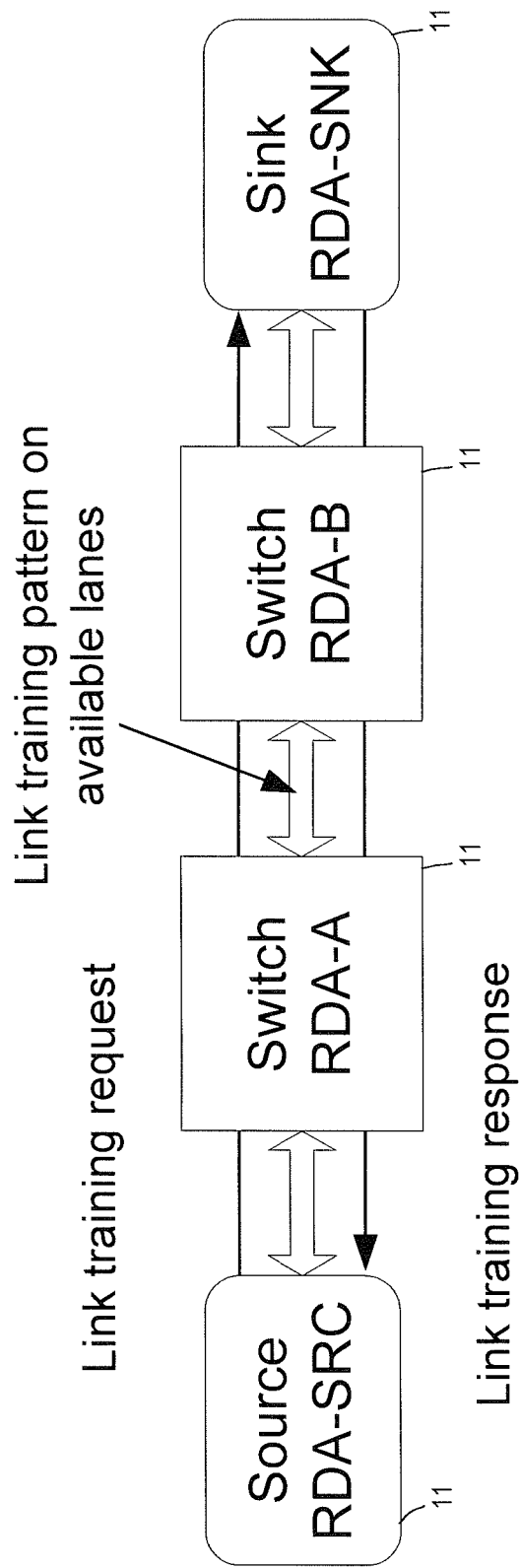
FIG. 15 shows control message flow for communication lane training between the AV source device and the AV sink device via one or more AV bridge devices, according to an embodiment of the invention.

Link training is initiated by transmitting a link training request control message on the default lanes from the source to the sink device. The link training control message indicates the type of link training used. FIG. 15 illustrates flow of control messages for two options for link training including: partial progressive link training and full link training, according to an embodiment of the invention. In one example of partial progressive link training, since the ensuing bandwidth requirement for isochronous streaming may be known on per hop basis, only a fewer number of lanes to support the ensuing bandwidth are trained, if not already trained.

For example, referring to FIG. 14 in conjunction with FIG. 15, only two lanes are trained on each hop if all are in hbr. However, if some lanes are in lbr or mbr then more lanes are required to be trained in order to meet the ensuing data rate bandwidth. As an optimization, a memory based approach is used to start training from the previous saved configuration for the port (a state variable for lanes is maintained). The amount of time required to train the links is reduced by using this method. The number of lanes required to support a target bandwidth may first consider temporally available lanes as these lanes may not need additional training This would further reduce the time spent in training Full link training mode In one example of full link training, all free lanes from the AV source device to the AV sink device are trained. In the network shown in FIG. 14, this case will train [3, 4, 4, 3] lanes from the source device to the sink device. The actual link training patterns are transmitted on the lanes that will be used for ensuing dataflow. Referring to FIG. 15, on per hop basis, when training of all possible available lanes does not meet the bandwidth requirement then a link training response message may be sent to the source device. The link training response control message may indicate the failure or may include the available supported data rate after training In another embodiment, no such failure message is sent to the source device. However, such failure message is only transmitted when the training completely fails.

The link training control message includes required end-to-end (i.e., e2e) bandwidth estimated based on the previous sub-processes or an identifier that reflects such information. Based on these details, intermediate AV devices in the path between the source and sink devices train their downstream links. Once the process is successfully completed, the sink device replies with a link training success response message. When link training results in error, an intermediate bridge device detecting such error sends an error message to the source device. In one embodiment, link training results in determining the maximum supported data rate on each hop. Thus, the final link training response may indicate to the source the maximum data rate supported end-to-end.

Sub-process-4: Isochronous Bandwidth Allocation for Communication

In one embodiment of the invention, RLI messaging is utilized before performing isochronous bandwidth allocation. RLI is performed twice since the first RLI before link training (or link adaptation) provides a coarse level of end-to-end bandwidth support, and the second RLI after link training provides a finer level of maximum bandwidth available after training The results of the RLI response in the two cases may be different in some instances when a few links can only support lbr and mbr after training In one embodiment, AV path connection setup process and link training may be combined such that on each link, link training and AV connection path setup are performed together. One example includes first training available lanes and then allocating isochronous communication resources on the trained lanes. The allocation of communication resources may begin by first allocating communication resources on lanes that are already trained or used for other streams (i.e., temporal lanes).

Figure 16:
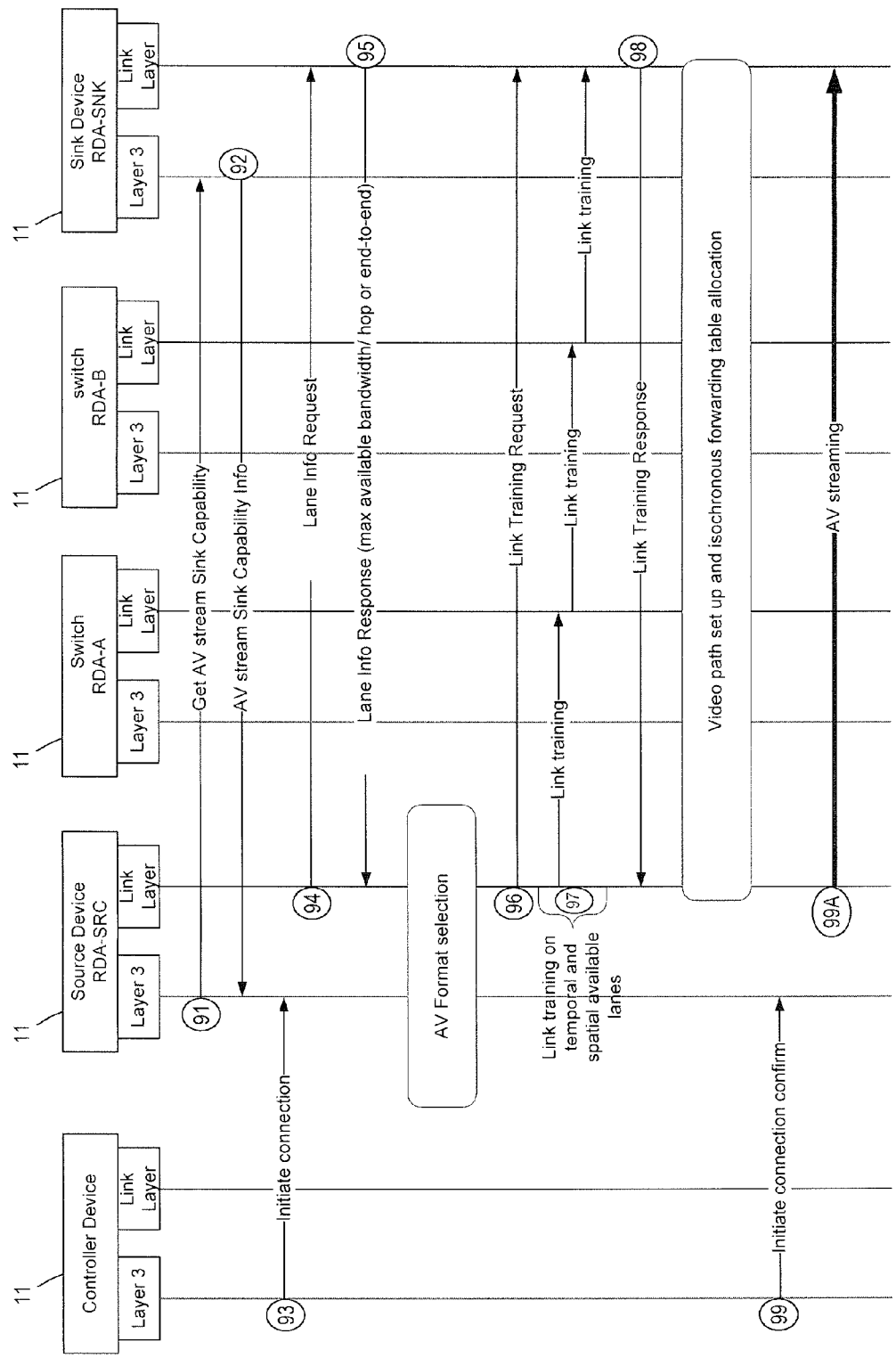
FIG. 16 illustrates a process for isochronous stream connection set up in an AV network, according to an embodiment of the invention.

FIG. 16 illustrates a process 85 for isochronous stream connection set up in an AV network such as AV network 90 in FIG. 11, according to an embodiment of the invention. In process block 91 the source device transmits a stream sink capability information request message to the sink device and in process block 92 the sink device responds with a sink capability information response message. In process block 93 isochronous stream connection set up begins when a stream controller device transmits an initiate control message (transmitted over layer 3).

In process block 94 the source device determines per hop RLI details by transmitting an RLI request message (sub-process-1 above), and in process block 95 the sink device provides the display capability information of the stream sink with an RLI response message (sub-process-2 above). In process block 96 the source device transmits a link training request to the sink device, in process block 97 the links in the path between the source and sink devices are trained, and in process block 98 the sink device send a link training response message to the source device (sub-process-3 above). In process block 99 a connection confirm message is transmitted and in process block 99A isochronous bandwidth is allocated for AV streaming (sub-process-4 above).

In one embodiment, the above sub-process approach allows selectively skipping or combining certain of the sub-processes. For example, sub-process-1 and sub-process-2 can be combined for efficiency. Alternatively, sub-process-2 and sub-process-3 may be skipped as well based on prior information. In another embodiment, the order of these sub-processes may be changed such that first determine the display capability, second determine the maximum additional allowable bandwidth end-to-end, by exchanging RLI request and response messages, third allocate isochronous stream, and fourth train these lanes.

Figure 17:
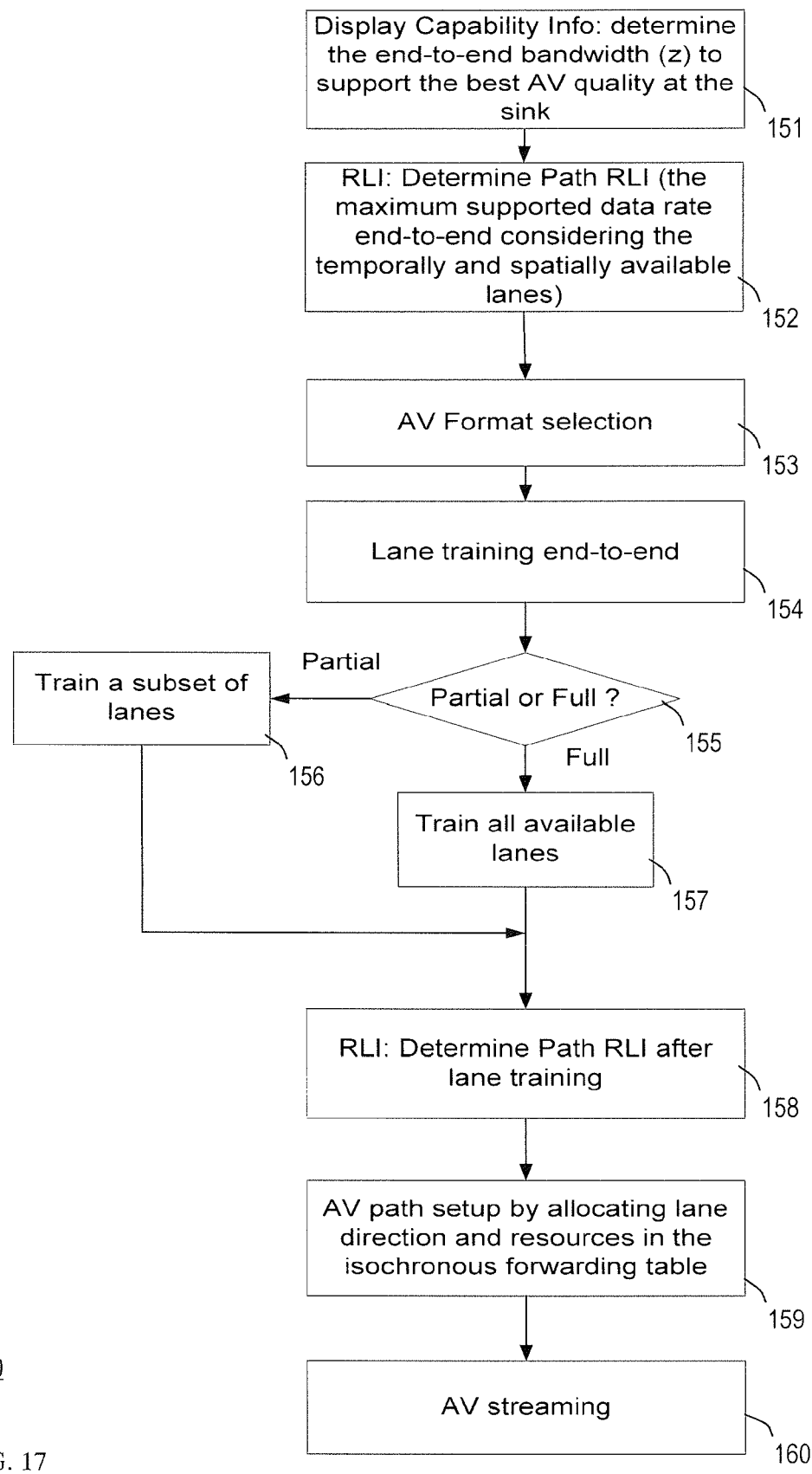
FIG. 17 illustrates a flowchart for isochronous stream connection set up in an AV network, according to an embodiment of the invention.

FIG. 16 shows a timing diagram when all sub-processes are performed according to the flowchart in FIG. 17 for a process 150 isochronous connection set-up, according to an embodiment of the invention. The process 150 includes the following process blocks:

Process block 151: Initiating display capability information control message to determine the end-to-end bandwidth (z) to support the best AV quality at the sink device.

Process block 152: Initiating RLI control message to determine Path RLI (the maximum supported data rate end-to-end considering the temporally and spatially available lanes).

Process block 153: Performing AV format selection, such as selecting AV format based on: 1) display capability at the sink device; 2) AV source capability; and 3) available bandwidth from the AV source to the sink.

Process block 154: Initiating lane training end-to-end (i.e., lane training on path from source device through any bridge devices to the sink device).

Process block 155: If partial link training, proceed to block 156, otherwise proceed to block 157.

Process block 156: Training a subset of lanes. Proceed to block 158.

Process block 157: Training all available lanes.

Process block 158: Initiating RLI control message to determine Path RLI after lane training Process block 159: Performing AV path setup by allocating lane direction and resources in the isochronous forwarding table.

Process block 160: Performing AV streaming.

In one embodiment there is no fixed order of various processes except that RLI and display capability information control messages are exchanged before setting up the AV path using AV path setup request and response control messages. In one embodiment, after link training the source device may again obtain the available maximum bandwidth end-to-end using RLI request and response control messages. This is performed to obtain a more accurate estimate on the maximum bandwidth available end-to-end since links are now trained. The video path setup request would be initiated based on this estimated end-to-end bandwidth.

In one embodiment, each device in the AV network according to the invention comprises a MAC layer and a PHY layer, configured for communication over a wired network, according to embodiments of the invention. As noted, embodiments of the invention may be implemented in said AV devices as MAC layer components (MAC is data communication protocol sub-layer of the Data Link Layer in the seven-layer Open Systems Interconnection (OSI) model). According to embodiments of the invention, connection set-up and isochronous data communication (such as processes described above in relation to in FIGS. 9-17), may be implemented as connection set-up modules in the MAC layers of the AV devices 11.

As such embodiments of the invention provide a method and system for connection set up and establishing AV path that is bi-directional between physical ports of two AV devices, wherein AV data can travel bi-directionally (i.e., in opposite directions) on a communication link between two AV devices for isochronous data stream management in AV networks.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, as consumer electronic devices, etc., in wireless devices, in wireless transmitters, receivers, transceivers in wireless networks, etc. Further, embodiments of the invention can take the form of an entirely hardware embodiment, an entirely software embodiment or an embodiment containing both hardware and software elements.

Figure 18:
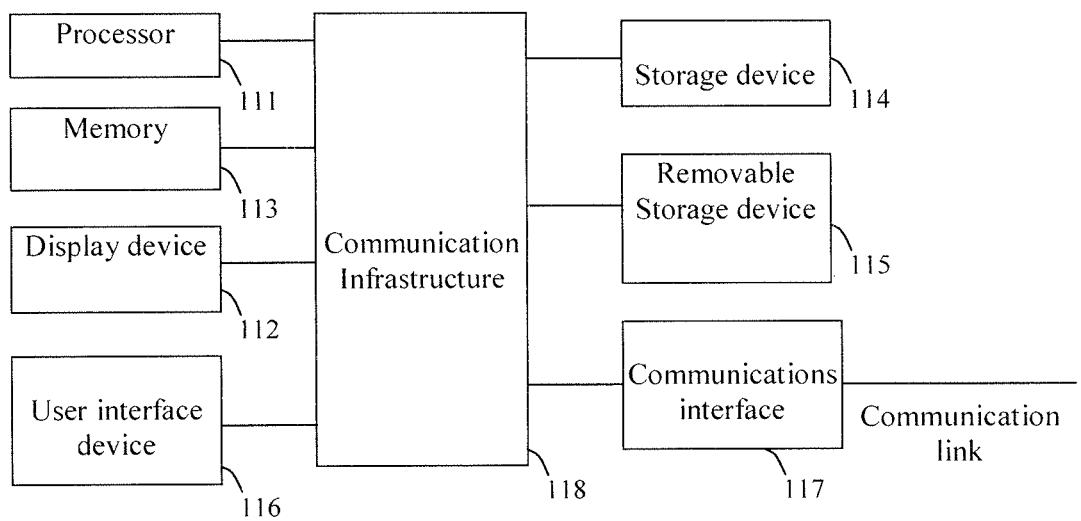
FIG. 18 is a high level block diagram showing an information processing system comprising a computer system useful for implementing an embodiment of the invention.

FIG. 18 is a high level block diagram showing an information processing system comprising a computer system 100 useful for implementing an embodiment of the present invention. The computer system 100 includes one or more processors 111, and can further include an electronic display device 112 (for displaying graphics, text, and other data), a main memory 113 (e.g., random access memory (RAM)), storage device 114 (e.g., hard disk drive), removable storage device 115 (e.g., removable storage drive, removable memory module, a magnetic tape drive, optical disk drive, computer readable medium having stored therein computer software and/or data), user interface device 116 (e.g., keyboard, touch screen, keypad, pointing device), and a communication interface 117 (e.g., modem, a network interface (such as an Ethernet card), a communications port, or a PCMCIA slot and card). The communication interface 117 allows software and data to be transferred between the computer system and external devices. The system 100 further includes a communications infrastructure 118 (e.g., a communications bus, cross-over bar, or network) to which the aforementioned devices/modules 11 through 17 are connected.

Information transferred via communications interface 117 may be in the form of signals such as electronic, electromagnetic, optical, or other signals capable of being received by communications interface 117, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments of the present invention have been described with reference to flowchart illustrations and/or block diagrams of methods, apparatus (systems) and computer program products according to embodiments of the invention. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing embodiments of the present invention. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer programs (i.e., computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor and/or multi-core processor to perform the features of the computer system. Such computer programs represent controllers of the computer system.

Though the present invention has been described with reference to certain versions thereof; however, other versions are possible. Therefore, the spirit and scope of the appended claims should not be limited to the description of the preferred versions contained herein.

What is claimed is:

1. A method of isochronous communication between audio/video (AV) devices, comprising:
   establishing isochronous connection between a source AV device and a destination AV device, each AV device including multiple I/O ports for connecting the AV device to another AV device via a communication link comprising multiple communication lanes;
   wherein establishing said isochronous connection comprises:
      determining end-to-end temporal and spatial lane availability between the source AV device and the destination AV device to support a target data rate; and
      allocating processing and communication resources on available lanes based on the target data rate for isochronous communication for the available lanes between the source AV device and the destination AV device, wherein each of the source AV device and the destination AV device uses a dynamically updated table for forwarding control messages and allocation of isochronous communication resources.

2. The method of claim 1, further comprising:
   determining supported and available end-to-end isochronous data rate on the available lanes between the source AV device and the destination AV device.

3. The method of claim 2, wherein:
   determining supported end-to-end isochronous data rate comprises determining available communication bandwidth on temporally and spatially free lanes between the source AV device and the destination AV device.

4. The method of claim 3, wherein:
   determining available communication bandwidth comprises determining maximum end-to-end isochronous communication bandwidth availability between the source AV device and the destination AV device.

5. The method of claim 4, further comprising:
   determining link training information based on link training on one or more of the free lanes on each link to meet said target data rate for isochronous communication between the source AV device and the destination AV device.

6. The method of claim 5, wherein link training comprises:
   partial progressive link training per communication link on at least a minimum number of lanes that can support the target data rate end-to-end.

7. The method of claim 6, wherein link training further comprises:
   link training one or more lanes without exceeding a maximum number of free lanes available, to meet the target data rate end-to-end.

8. The method of claim 5, wherein link training further comprises:
   link training per communication link on lanes supported in a given direction.

9. The method of claim 5, wherein:
   allocating processing and communication resources further comprises allocating communication resources on trained lanes based on the target data rate for isochronous communication between the source AV device and the destination AV device.

10. The method of claim 5, further comprising:
    determining a capability of the destination AV device; and
    determining a capability of the source AV device;
    wherein allocating processing and communication resources further includes allocating communication resources on trained lanes based on the capabilities of the source AV device and the destination AV device, and the target data rate.

11. The method of claim 5, wherein link training comprises:
    full link training per communication link on all lanes end-to-end.

12. The method of claim 1, further comprising:
    transmitting request and response control messages on a fixed set of separate lanes between the source AV device and the destination AV device for establishing said isochronous connection.

13. The method of claim 5, further comprising:
    streaming isochronous AV data in a switched network of the AV devices on trained lanes, wherein the AV data comprises uncompressed video information and audio information.

14. The method of claim 1, further comprising:
    establishing isochronous connection between the source AV device and the destination AV device initiated at a layer above an IP Layer of an AV device.

15. The method of claim 1, wherein the processing and communication resources comprise one or more particular lanes and one or more particular ports.

16. The method of claim 15, wherein port and lane forwarding of a received control message is determined as needed.

17. The method of claim 16, wherein a dedicated lane is not required for exchange of control messages.

18. The method of claim 1, wherein the table comprises a forwarding table, and each forwarding table is dynamically updated based on control messages.

19. The method of claim 18, wherein the control messages comprise video path setup requests and response messages from the AV source device to the AV destination device, and the video path setup requests are used for allocation of the isochronous resources.

20. The method of claim 19, wherein the isochronous communication resources comprise video stream information, communication lane information and symbols on corresponding communication lanes, and the isochronous resources are tracked in each forwarding table.

21. An audio/video (AV) device, comprising:
    a connection set-up module that establishes isochronous connection between the AV device and a peer AV device, the AV device including multiple I/O ports for communication with the peer AV device via a communication link comprising multiple communication lanes; and
    a physical layer for communicating data between the AV device and the peer AV device;
    wherein the connection set-up module establishes said isochronous connection by:
       determining end-to-end temporal and spatial lane availability between a source AV device and a destination AV device to support a target data rate, and allocating processing and communication resources on available lanes between the source AV device and the destination AV device based on the target data rate for isochronous communication for the available lanes between the source AV device and the destination AV device in a switched network of AV devices, wherein each of the source AV device and the destination AV device use a dynamically updated table for forwarding control messages and allocation of isochronous communication resources.

22. The AV device of claim 21, wherein:
the connection set-up module determines supported and available end-to-end isochronous data rate on the available lanes between the source AV device and the destination AV device.

23. The AV device of claim 22, wherein:
the connection set-up module determines available communication bandwidth on temporally and spatially free lanes between the source AV device and the destination AV device.

24. The AV device of claim 23, wherein:
the connection set-up module determines maximum end-to-end isochronous communication bandwidth availability between the source AV device and the destination AV device.

25. The AV device of claim 24, wherein:
the connection set-up module determines link training information by performing link training on one or more of the temporally and spatially free lanes to meet said target data rate for isochronous communication between the source AV device and the destination AV device.

26. The AV device of claim 25, wherein link training comprises partial progressive link training per communication link on at least a minimum number of lanes that can support the target data rate end-to-end.

27. The AV device of claim 26, wherein link training comprises link training one or more lanes without exceeding a maximum number of free lanes available, to meet the target data rate end-to-end.

28. The AV device of claim 25, wherein link training comprises link training per communication link on lanes supported in a given direction.

29. The AV device of claim 25, wherein:
the connection set-up module allocates processing and communication resources on trained lanes based on the target data rate for isochronous communication between the source AV device and the destination AV device.

30. The AV device of claim 25, wherein:
the connection set-up module further determines a capability of the destination AV device, and determines a capability of the source AV device, wherein allocating processing and communication resources further includes allocating communication resources on trained lanes based on the capabilities of the source AV device and the destination AV device, and the target data rate.

31. The AV device of claim 25, wherein link training comprises full link training per communication link on all lanes end-to-end.

32. The AV device of claim 21, wherein the connection set-up module facilitates transmission of request and response control messages on a fixed set of separate lanes between the source AV device and the destination AV device for establishing said isochronous connection.

33. The AV device of claim 25, wherein the connection set-up module facilitates streaming isochronous AV data in a switched network of the AV devices on trained lanes, wherein the AV data comprises uncompressed video information and audio information.

34. The AV device of claim 21, wherein the connection set-up module establishes isochronous connection between the source AV device and the destination AV device initiated at a layer above an IP Layer of an AV device.

35. An audio/video (AV) isochronous streaming system, comprising:
a switched network of AV devices serially connected via communication links;
wherein at least one AV device of said AV devices comprises:
a connection set-up module that establishes isochronous connection to a peer AV device, the at least one AV device including multiple I/O ports for communication with the peer AV device via a communication link comprising multiple communication lanes; and
a physical layer for communicating data between the AV device and the peer AV device;
wherein the connection set-up module establishes said isochronous connection by: determining end-to-end temporal and spatial lane availability between a source AV device and a destination AV device to support a target data rate, and allocating processing and communication resources on the available lanes based on the target data rate for isochronous communication for the available lanes between the source AV device and the destination AV device in the switched network of AV devices, wherein each of the source AV device and the destination AV device use a dynamically updated table for forwarding control messages and allocation of isochronous communication resources.

36. The system of claim 35, wherein:
the connection set-up module determines supported and available end-to-end isochronous data rate on the available lanes between the source AV device and the destination AV device.

37. The system of claim 36, wherein:
the connection set-up module determines available communication bandwidth on temporally and spatially free lanes between the source AV device and the destination AV device.

38. The system of claim 37, wherein:
the connection set-up module determines maximum end-to-end isochronous communication bandwidth availability between the source AV device and the destination AV device.

39. The system of claim 38, wherein:
the connection set-up module determines link training information by performing link training on one or more of the temporally and spatially free lanes to meet said target data rate for isochronous communication between the source AV device and the destination AV device.

40. The system of claim 39, wherein link training comprises partial progressive link training per communication link on at least a minimum number of lanes that can support the target data rate end-to-end.

41. The system of claim 40, wherein link training comprises link training one or more lanes without exceeding a maximum number of free lanes available, to meet the target data rate end-to-end.

42. The system of claim 39, wherein link training comprises link training per communication link on lanes supported in a given direction.

43. The system of claim 39, wherein:
the connection set-up module allocates communication resources on trained lanes based on the target data rate for isochronous communication between the source AV device and the destination AV device.

44. The system of claim 39, wherein:
the connection set-up module further determines a capability of the destination AV device, and determines a capability of the source AV device, wherein allocating processing and communication resources further includes allocating communication resources on trained lanes based on the capabilities of the source AV device and the destination AV device, and the target data rate.

45. The system of claim 39, wherein link training comprises full link training per communication link on all lanes end-to-end.

46. The system of claim 35, wherein the connection set-up module facilitates transmission of request and response control messages on a fixed set of separate lanes between the source AV device and the destination AV device for establishing said isochronous connection.

47. The system of claim 35, wherein the connection set-up module facilitates streaming isochronous AV data in a switched network of the AV devices on trained lanes, wherein the AV data comprises uncompressed video information and audio information.

48. The system of claim 35, wherein the connection set-up module establishes isochronous connection between the source AV device and the destination AV device initiated at a layer above an IP Layer of an AV device.

49. The system of claim 35, wherein said at least one AV device comprises a switched bridge AV device serially connected between the source AV device and the destination AV device.

\* \* \* \* \*